(12) United States Patent
Pettit et al.

(10) Patent No.: US 8,134,572 B2
(45) Date of Patent: Mar. 13, 2012

(54) ASSIGNING REGION ATTRIBUTES IN A DRAWING

(75) Inventors: Teri Pettit, Santa Cruz, CA (US); Paul J. Asente, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 676 days.

(21) Appl. No.: 12/321,481

(22) Filed: Jan. 21, 2009

(65) Prior Publication Data

US 2009/0202146 A1    Aug. 13, 2009

Related U.S. Application Data

(62) Division of application No. 11/109,490, filed on Apr. 19, 2005, now Pat. No. 7,502,028.

(51) Int. Cl.
G09G 5/00 (2006.01)
G09G 5/02 (2006.01)
G06T 11/20 (2006.01)

(52) U.S. Cl. ......... 345/581; 345/441; 345/442; 345/589

(58) Field of Classification Search ............... 345/441, 345/442, 581, 589
See application file for complete search history.

(56) References Cited

U.S. PATENT DOCUMENTS 7,262,782 B1 *    8/2007    Parenteau et al. ............. 345/629

OTHER PUBLICATIONS

Davis et al, CorelDraw 10 for Windows, 2001.*

* cited by examiner

*Primary Examiner* — Jeffrey Chow
(74) *Attorney, Agent, or Firm* — Van Pelt, Yi & James LLP

(57) ABSTRACT

Techniques for assigning a region attribute to a region in a drawing are disclosed. One technique includes editing the drawing to define a current region, associating the current region with a previous region having a previous region attribute, and assigning the previous region attribute to the current region. Another technique includes deriving a previous path attribute and a relation for a previous path, editing the drawing to define a current set of paths having current regions, and assigning the previous path attribute to at least one current region based on the relation of the previous path.

4 Claims, 24 Drawing Sheets

Before

After

Before

After

ASSIGNING REGION ATTRIBUTES IN A DRAWING

CROSS REFERENCE TO OTHER APPLICATIONS

This application is a divisional of U.S. patent application Ser. No. 11/109,490, entitled ASSIGNING REGION ATTRIBUTES IN A DRAWING filed Apr. 19, 2005, now U.S. Pat. No. 7,502,028 which is incorporated herein by reference for all purposes.

BACKGROUND OF THE INVENTION

Drawings are used to express ideas visually on the web, in print or in other media. Drawings can be created and edited in software using various drawing applications. A typical drawing includes a plurality of paths, each of which defines a set of zero or more enclosed areas. For example, a straight line segment has no enclosed areas, a square has one, and a figure eight has two. All areas defined by a single path are typically filled with an attribute, such as color. When a path is modified, the color of its enclosed areas remains the same. Paths are maintained at different layers so that their areas can overlap but not intersect each other. In order to color an intersection, the user has to perform a complicated work around. For example the user could create a separate path enclosing an area the same shape as the desired intersecting area, and then fill it with the desired color. An improved method of handling attributes for areas defined by intersections is needed. In addition, it would be useful to have a method that maintains consistency of these attributes across edits.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Regions can be formed by the intersection of a set of open or closed paths. Each region can be given or assigned an attribute, such as color. Modifying the paths in the set can create new regions. Attributes can be assigned to these new regions to be consistent with the attributes of the previous regions.

Figure 1A:
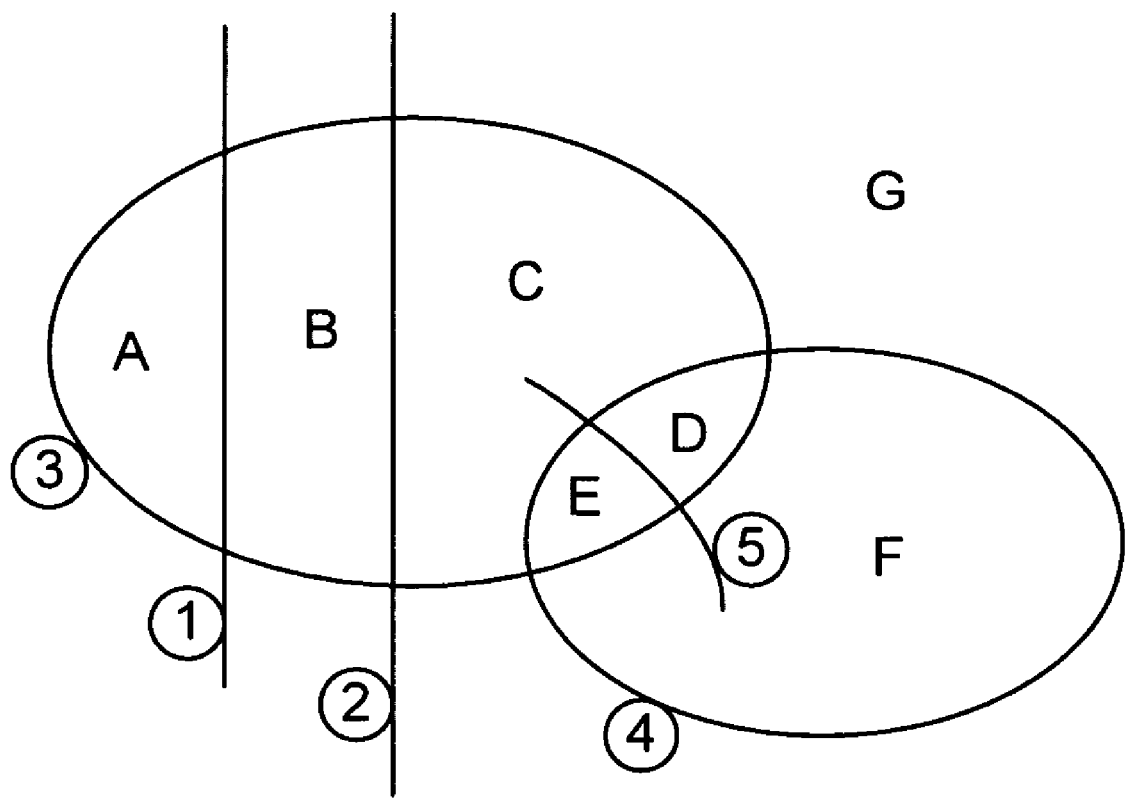
FIG. 1A illustrates an example of a drawing.

FIG. 1A illustrates an example of a drawing. In this example, drawing 100 is shown to include five paths, paths 1-5. In the following figures, paths are identified with circled colored numbers (usually red) and regions are identified with upper-case letters. As used herein, color refers to any attribute of a region, path, subpath, or shape. In any of these examples, other attributes can be used, including, but not limited to, color, absence of color, a pattern (e.g., hatching), a texture, a gradient, a portion of an image, or an abstract attribute, such as an identifier.

In this example, paths 1, 2, and 5 are examples of open paths. Paths 3 and 4 are examples of closed paths. A set of open or closed paths can intersect themselves or each other. By doing so, they define a set of regions. A region can be bounded (finite area) or unbounded (infinite area). For example, a bounded region could be bounded by subpath(s) and/or path(s). In some embodiments, a region is defined as a portion of a plane that is completely enclosed by paths and which is not further divided by any paths into two or more sub-regions. In this example, paths 1-5 form regions A-G. In the following figures, the region surrounding the paths (e.g., region G) will not necessarily be shown or discussed, but can be assumed to exist. An edge or boundary of a region refers to the portion of a path that bounds the region.

Figure 1B:
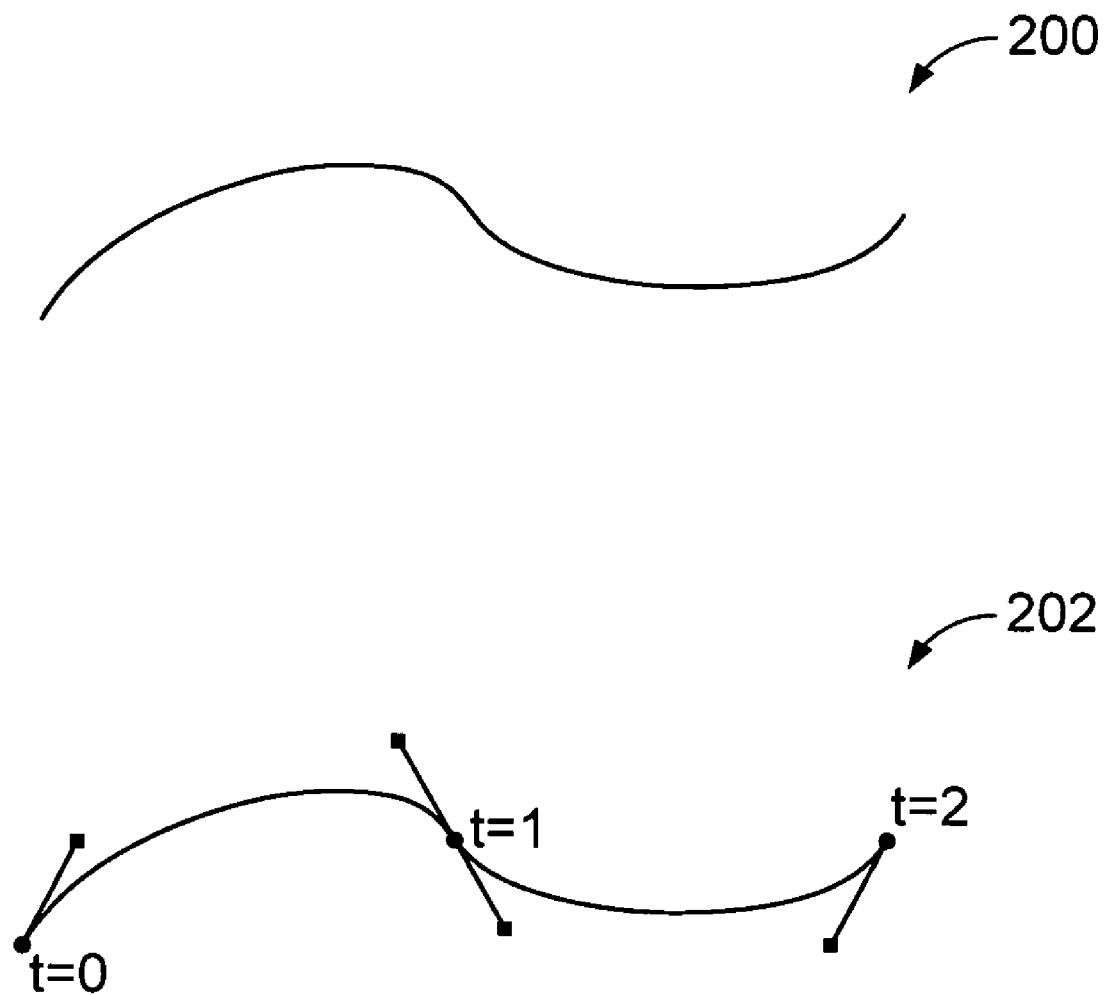
FIG. 1B illustrates a path and a parametric representation of the path.

FIG. 1B illustrates a path and a parametric representation of the path. Path 200 can be converted to (or arbitrarily closely approximated by) a parametric representation 202. For example, the path can be parametrized in one variable, t, where t varies from 0 to some positive value. In some embodiments, the parametric representation is an end-to-end connected set of Bèzier cubic curves, with each segment parameterized from 0 to 1. Points along the path are given an overall parameterization value of the sum of their Bèzier parameter and their curve number in the ordering, starting with 0 for the first curve. The first Bèzier curve is parameterized from 0-1, the second from 1-2, the third from 2-3, etc. In this example, parametric representation 202 is a connected Bèzier parametric representation. Closed paths can be given an arbitrary but consistent 0 point in the parameterization. If the path does not change, the 0 point does not change, and if the 0 point changes, the path is considered modified.

In some embodiments, each path is associated with a direction. For example, the direction could be defined by its parameterization. The path can be said begin at the point with a 0 parameter and end at the point with the highest parameter. If one traverses a path from beginning to end, certain things may be said to be on the left side of the path or on the right side of the path.

In some embodiments, each path in a set is given an arbitrary but unique identifier that persists across modifications. Paths added to the set are given an identifier different from any already in the set.

Figure 2A:
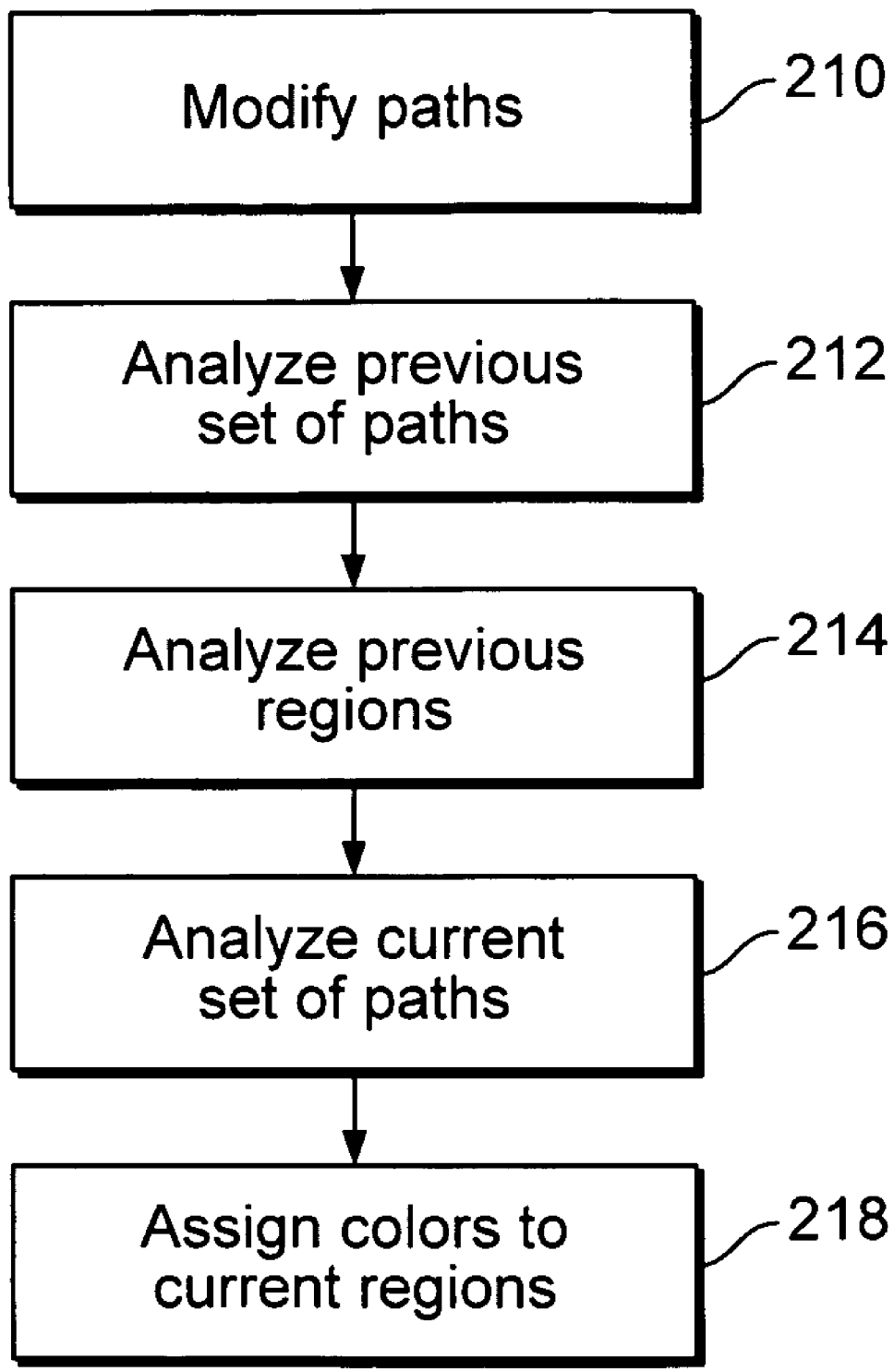
FIG. 2A is a flowchart illustrating a process for assigning colors to modified regions.

FIG. 2A is a flowchart illustrating a process for assigning colors to modified regions. In this example, a set of paths defines a set of regions, with each region having a color. Regions can be at the same layer. A modification is made to the set of paths (210). The modification can include adding one or more paths to the set, removing one or more paths from the set, or changing the shapes, positions, or orientations of one or more paths in the set. The previous set of paths is analyzed (212). The previous regions are analyzed (214). The current set of paths is analyzed (216). Colors are assigned to the current regions (218). (212)-(216) are more fully described below.

As used herein, the drawing prior to the modification comprises a set of parameterized paths with identifiers (called the "previous set"; paths in it are called "previous paths" and regions defined by these paths are called "previous regions"). After the modification, the drawing comprises a current set (called the "current set" of "current paths", defining "current regions"). For example, the current set could include the previous paths, with some paths deleted, some paths added, and some paths modified. The colors of current regions can be assigned based on the colors of previous regions, as more fully described below.

Figure 2B:
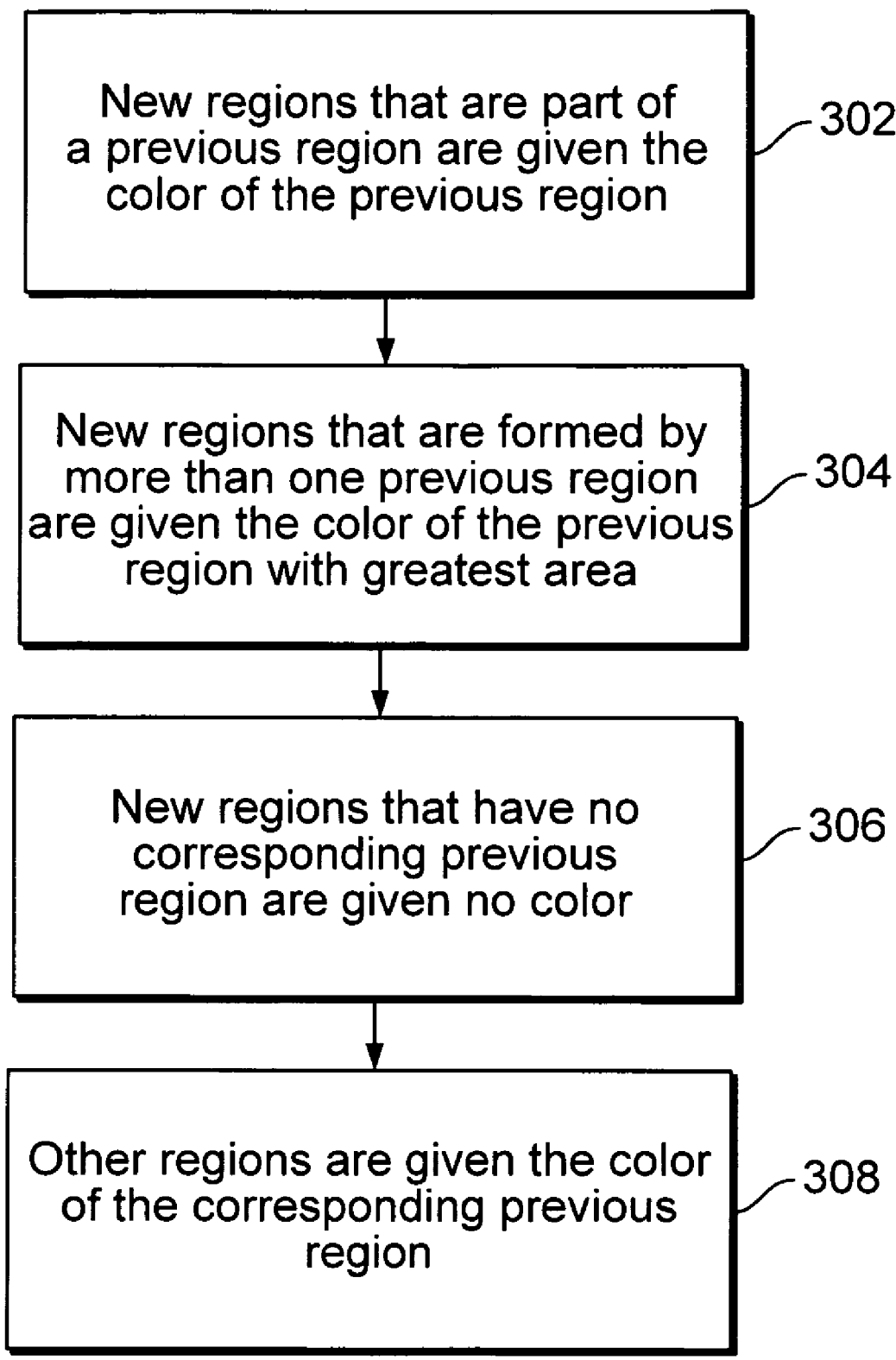
FIG. 2B is a flowchart illustrating a process of analyzing and assigning colors to current regions.

FIG. 2B is a flowchart illustrating a process of analyzing and assigning colors to current regions. In some embodiments, this process can be used to perform (212)-(218).

In this example, all modifications are additions, removals, truncations, or extensions. A path in the current set that has an identifier not assigned to any path in the previous set has been added to the current set. A path in the previous set that has an identifier not assigned to any path in the current set has been removed in the current set. A path in the current set that is completely covered by a corresponding path in the previous set has been truncated. (A truncation can be at either or both ends of an open path, can change a closed path into an open path, or can split a previous path into two or more current paths if the truncation occurs in the middle.) A path in the previous set that is completely covered by the corresponding path in the current set has been extended. (An extension can be at either or both ends of an open path, and can change an open path into a closed path.) An open path can also be extended at one end and truncated at the other.

Figure 2C:
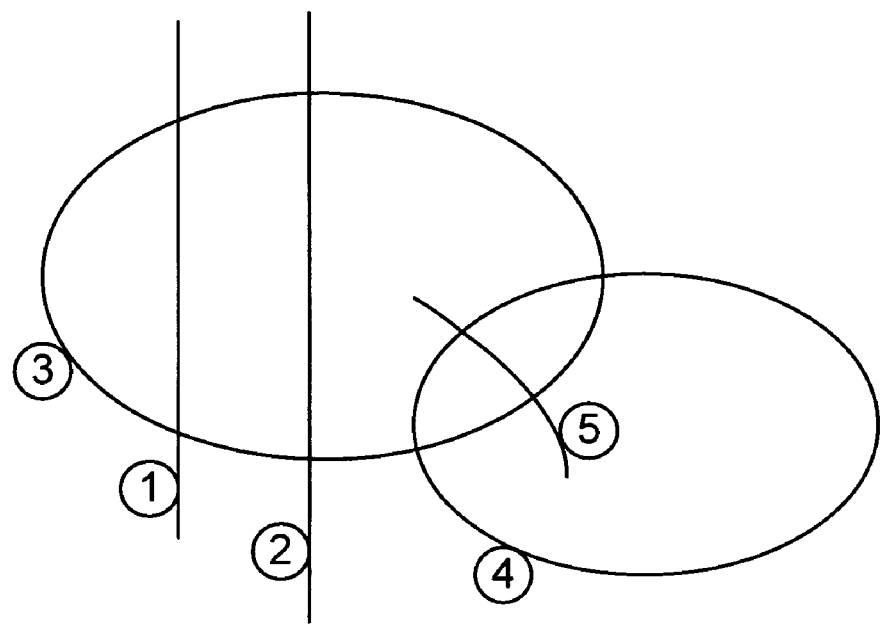
FIG. 2C illustrates a drawing before and after a modification.
Figure 2C:
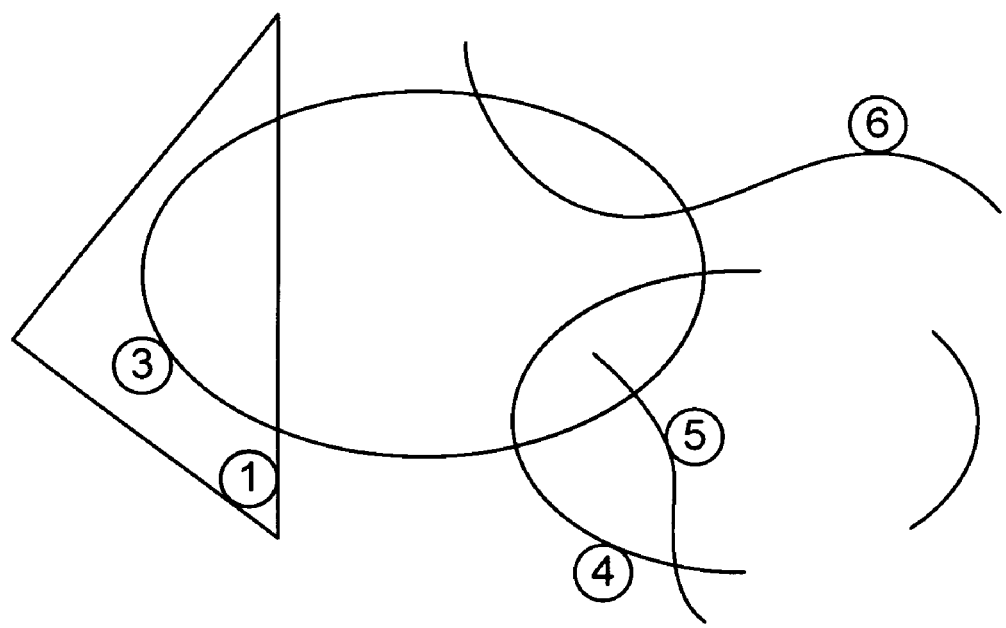

For example, FIG. 2C illustrates a drawing before and after a modification. In this example, path 1 has been extended (becoming closed in the process), path 2 has been removed, path 3 is unchanged, path 4 has been truncated (becoming two open paths in the process), path 5 has been both extended and truncated, and path 6 has been added.

Returning to FIG. 2B, for every region in the previous set that has been divided into multiple regions by added portions of current paths (either by path addition or by extension), the color of the previous region is given to every region in the current set that is part of the previous region (302). Then, for every set of regions in the previous set separated only by portions of the path that have been deleted (either by removal or truncation), the resulting combined region is given the color of whichever of the regions in this set had the larger area (304). In some embodiments, in the case of combining more than two regions, for each color, the total area of the region(s) having that color is determined. The color associated with the greatest total area is assigned to the resulting combined region. Colors can be assigned in various ways. For example, the resulting combined region could be given the color of whichever of the regions has the longest perimeter. Color assignment can be based on any other metric or measure.

Any region in the current set of regions that has no corresponding region in the previous set is given no color (306). All other regions are given the color of the corresponding previous region (308).

Figure 3:
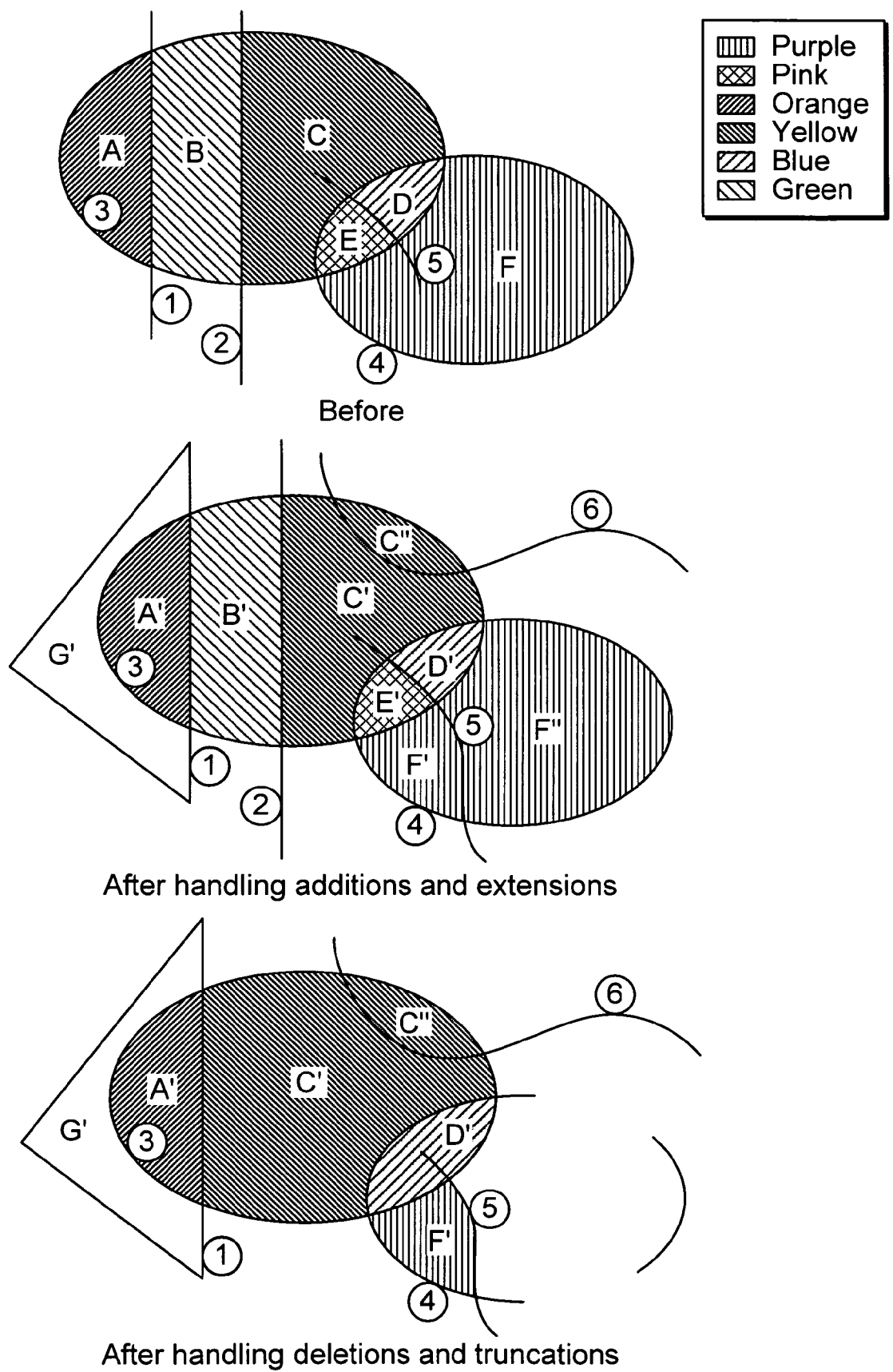
FIG. 3 illustrates a drawing before and after handling additions and extensions, and after handling deletions and truncations.

For example, FIG. 3 illustrates a drawing before and after handling additions and extensions, and after handling deletions and truncations. In this example, the extension of path 5 divided F into F' and F", so F' and F" are given the color of F (purple). The addition of path 6 divided C into C' and C", so C' and C" are given C's color (yellow).

Then the deletion of path 2 merges B' and C'; the merged region is given the color of C' (yellow) because C' is larger than B'. The truncation of path 5 merges D' and E'; the merged region is given the color of D' (blue) because D' is larger than E'.

Region G' is given no color because it has no corresponding previous region. Region F' disappears because of path 4's truncation. Region A' is given the color of A (orange), the corresponding previous region.

Figure 4A:
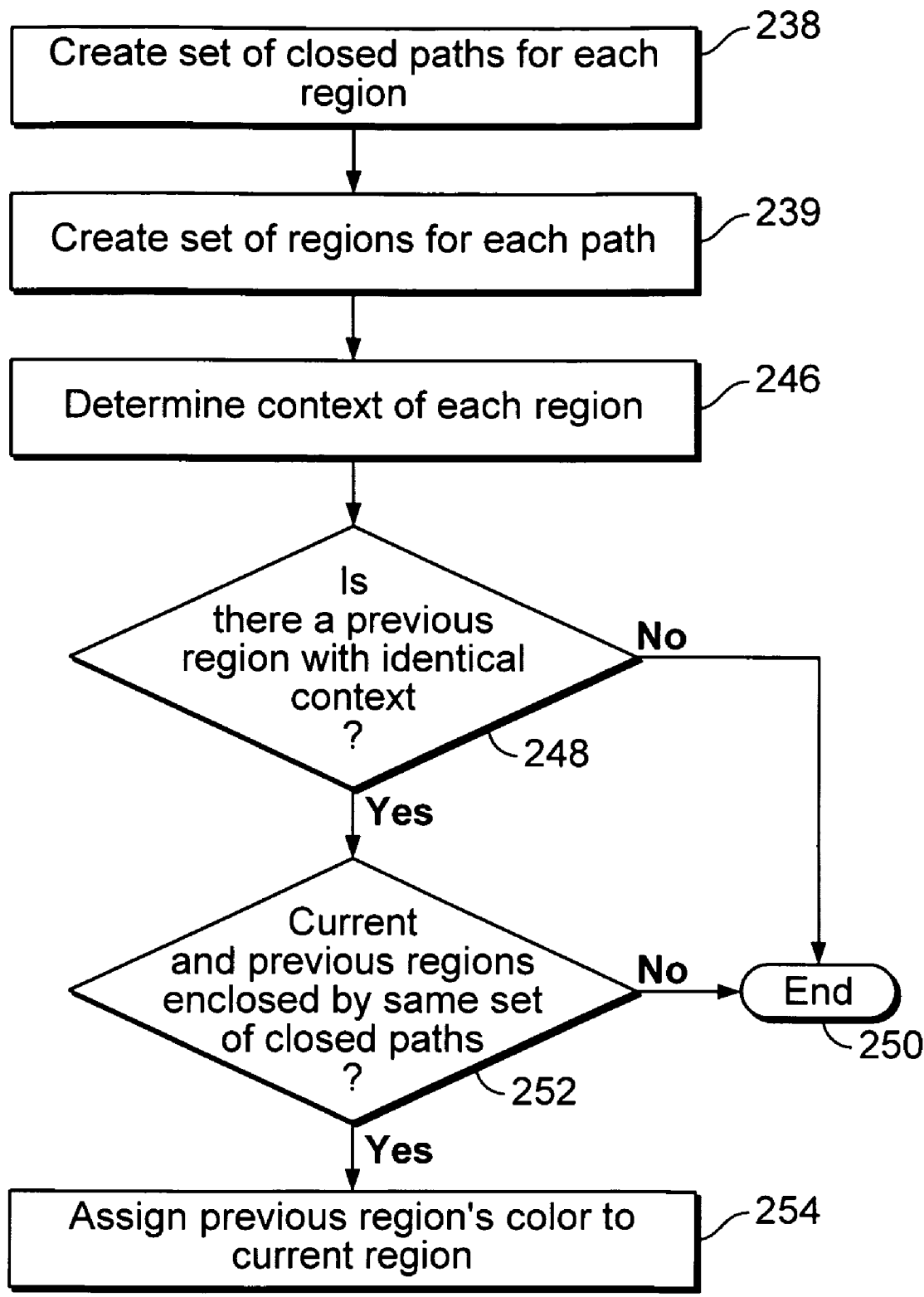
FIG. 4A is a flowchart illustrating a process of analyzing and assigning colors to current regions.

FIG. 4A is a flowchart illustrating a process of analyzing and assigning colors to current regions. In some embodiments, this process can be used to perform (212)-(218). In some embodiments, this process is performed when not all modifications are additions, extensions, deletions or truncations. In this example, geometric attributes of regions are compared. Geometric attributes include, for example, geometry, shape, orientation, location relative to other objects, or context. Context and context entries are more fully described below.

In this example, for every current region, a set of closed current paths that contain this region is created (238). For every closed current path, the set of regions that are enclosed by it is created (239). The same is done for every previous region and every previous path. Several examples are provided below under "Apparent Color and Stacking Order".

For every previous and current region, the context of the region is determined (246). The context includes a context entry for each boundary of the region. In some embodiments, each context entry includes: the identifier of the path; whether the region is to the right of the boundary, the left of the boundary, or both sides of the boundary; if the path is closed, whether the region is inside or outside of the path; and the values of the path's parameterization at the beginning and end of the boundary. If a particular path bounds the region in more than one place, the context entry is collected for each such place.

Figure 4B:
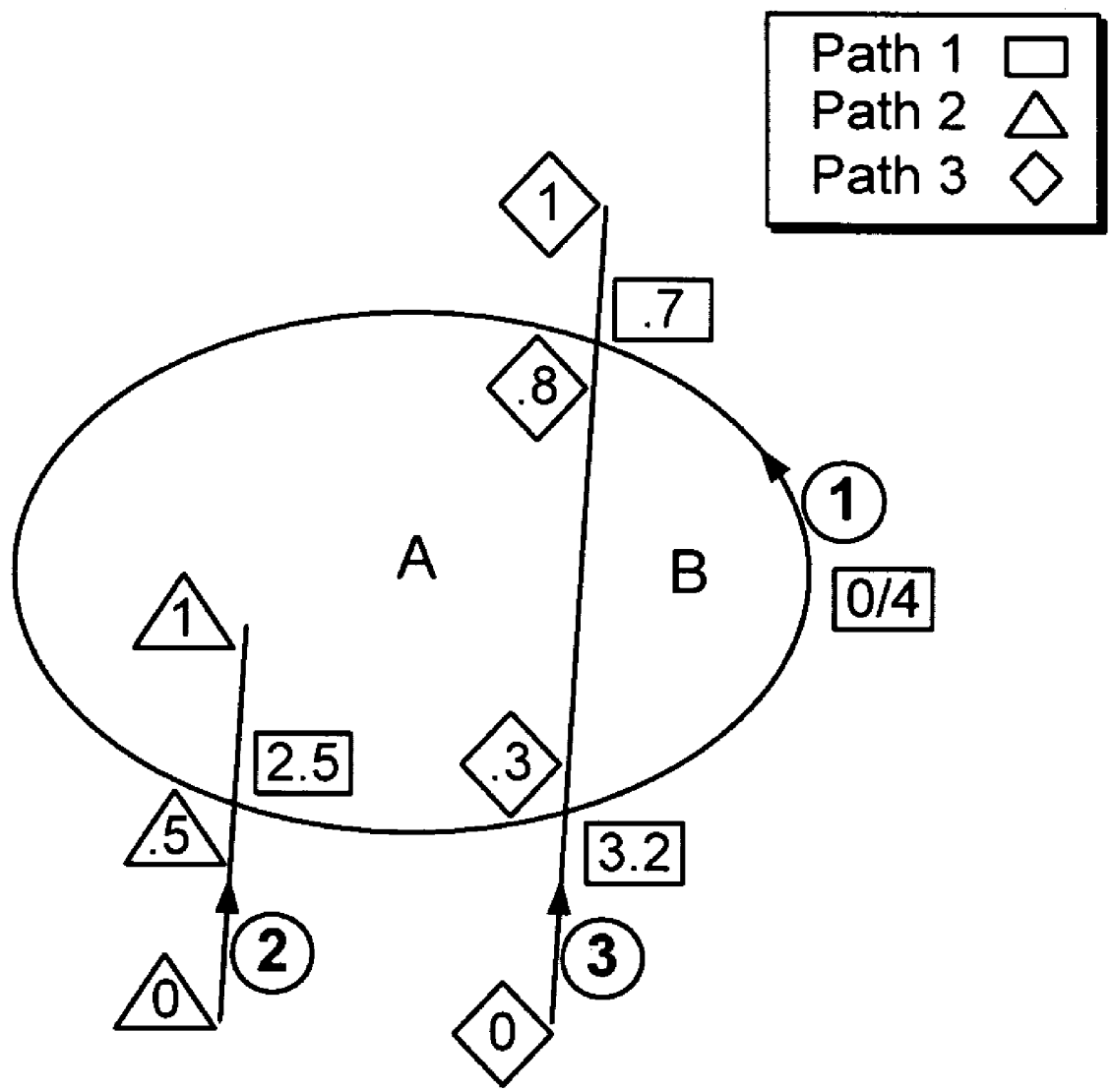
FIG. 4B illustrates a drawing having two regions.

For example, FIG. 4B illustrates a drawing having two regions. The sample parameterization values for path 1 are shown in red, for path 2 in green, and for path 3 in blue. Arrowheads show the directions of the paths.

For region A:
Path 1 bounds the region from 0.7 to 2.5. Region A is to the left of path 1.
Path 2 bounds the region from 0.5 to 1. Region A is on both sides of path 2.
Path 1 bounds the region from 2.5 to 3.2. Region A is to the left of path 1.
Path 3 bounds the region from 0.3 to 0.8. Region A is to the left of path 3.

For region B:
Path 1 bounds the region from 3.2 to 0.7 (going through 0/4). Region B is to the left of path 1.
Path 3 bounds the region from 0.3 to 0.8. Region B is to the right of path 3.

Returning to FIG. 4A, for each current region, if there is a previous region with context that is identical to the context of the current region (248), and if the current and previous regions are enclosed by the same set of closed paths (as determined in (238)) (252), then the previous region's color is assigned to the current region (254). Otherwise, the process ends (250). The process returns to (248) for each current region to be checked.

In other words, colors are assigned to regions that have not changed, unless they are enclosed by different closed paths. Being enclosed by different closed paths allows one of those paths to "cover" an additional region, even though that region's boundaries have not changed.

Figure 5A:
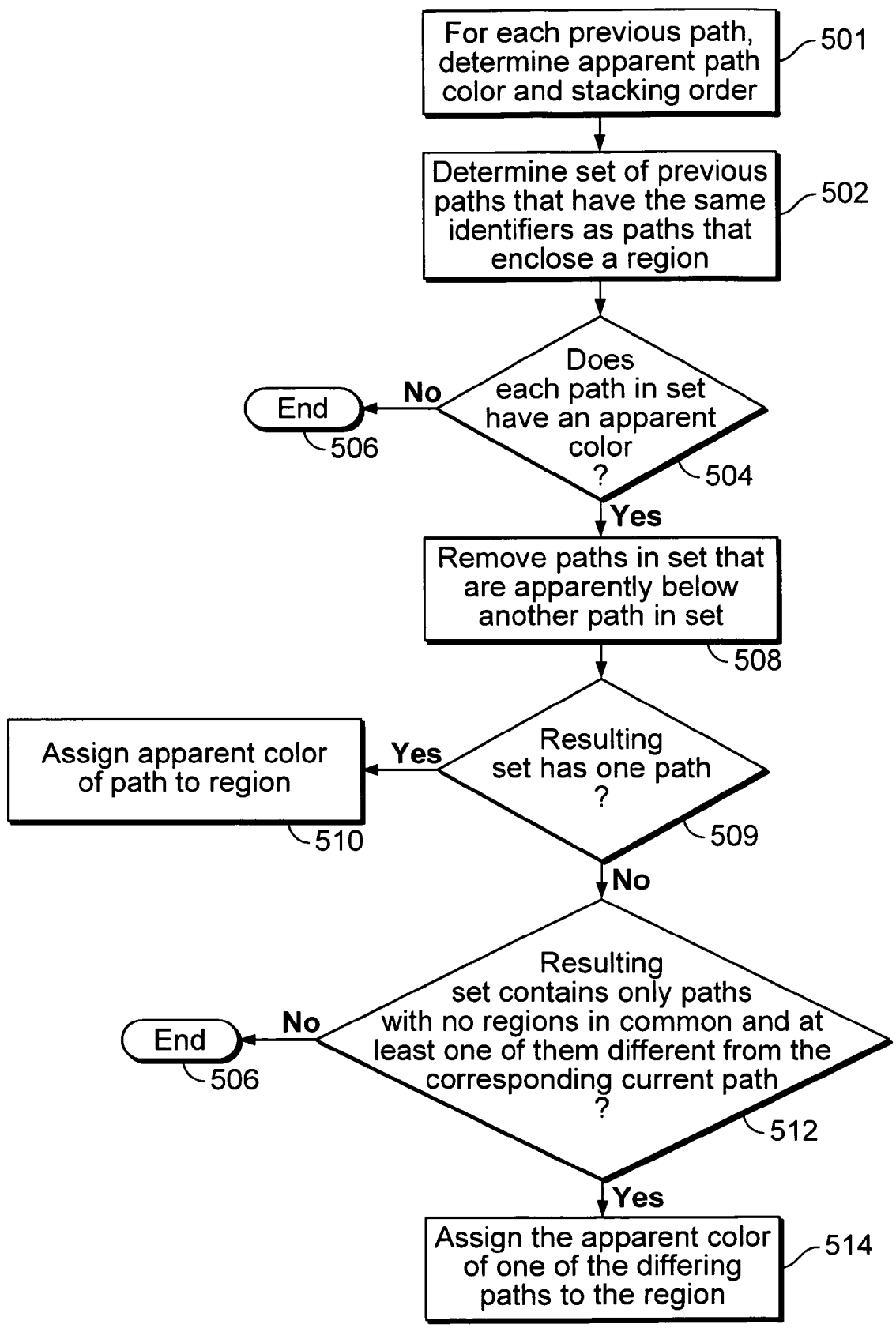
FIG. 5A is a flowchart illustrating a process of analyzing and assigning colors to current regions.

FIG. 5A is a flowchart illustrating a process of analyzing and assigning colors to current regions. In some embodiments, this process can be used to perform (212)-(218). In some embodiments, this process is performed for each current region that was not assigned a color after performing the process of FIG. 4A and that is enclosed by at least one closed path (e.g., as determined in (238)).

In this example, colors are assigned to regions inside closed paths, where it appears that the enclosing closed paths had an apparent color and stacking order. This process attempts to make apparently stacked closed paths act consistently with their colors and stacking order, e.g., the same colors and relative stacking order are maintained across the edit. A closed path can form one or more shapes (that could overlap with other path(s)). As used herein, the color of a closed path refers to the color of a shape formed by the closed path, and not necessarily the color of the path itself.

In this example, the apparent path colors and stacking order for the previous set of paths are determined (501). In some embodiments, the apparent path colors and stacking order can be determined according to the method of FIG. 18, as more fully described below. A set of previous paths that have the same identifiers as the paths that enclose the current region is determined (502). It is determined whether each path in this set has an apparent color (as determined in (502)) (504). If it is determined that each path in this set does not have an apparent color, then the process ends (506) In some embodiments, the process returns to (502) for each current region.

Otherwise, every path in this set that is apparently below another path in this set is removed (508). If the result of (508) contains only one path, the apparent color of this path is assigned to the region (510). In some embodiments, the process returns to (502) for each current region. If the result of (508) contains only paths with no regions in common, and if at least one of them is different from the corresponding current path, the apparent color of one of the differing paths is assigned to the current region (514). For example, one of the differing paths is selected arbitrarily.

Figure 5B:
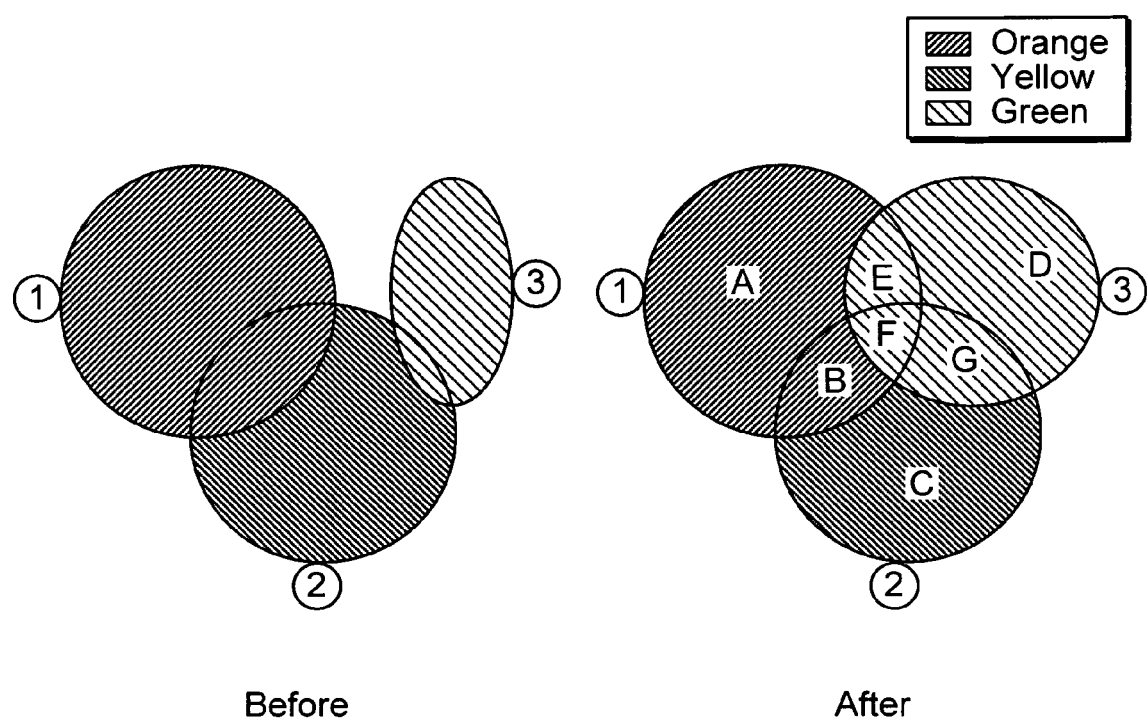
FIG. 5B illustrates a drawing before and after a modification.

For example, FIG. 5B illustrates a drawing before and after a modification. In this example, path 1 is apparently above path 2 and has the apparent color orange. Path 3 is apparently above path 2 and has the apparent color green. Path 2 has the apparent color yellow. Path 3 is modified.

All regions are within paths with previous paths that apparently had color, so (504) passes for each one.

Region A: Only within path 1, so assign path 1's color (orange).

Region B: Within paths 1 and 2. Remove path 2 because it was below path 1. Only path 1 is left, so assign path 1's color (orange).

Region C: Only within path 2, so assign path 2's color (yellow).

Region D: Only within path 3, so assign path 3's color (green).

Region E: Within paths 1 and 3. Paths 1 and 3 previously had no regions in common, and path 3 is different from the previous path, so assign-path 3's color (green).

Region F: Within paths 1, 2, and 3. Remove path 2 because it was below path 1 (also path 3), leaving paths 1 and 3. Paths 1 and 3 previously had no regions in common, and path 3 is different from the previous path, so assign path 3's color (green).

Region G: Within paths 2 and 3. Remove path 2 because it was below path 3. Only path 3 is left, so assign path 3's color (green).

Figure 6:
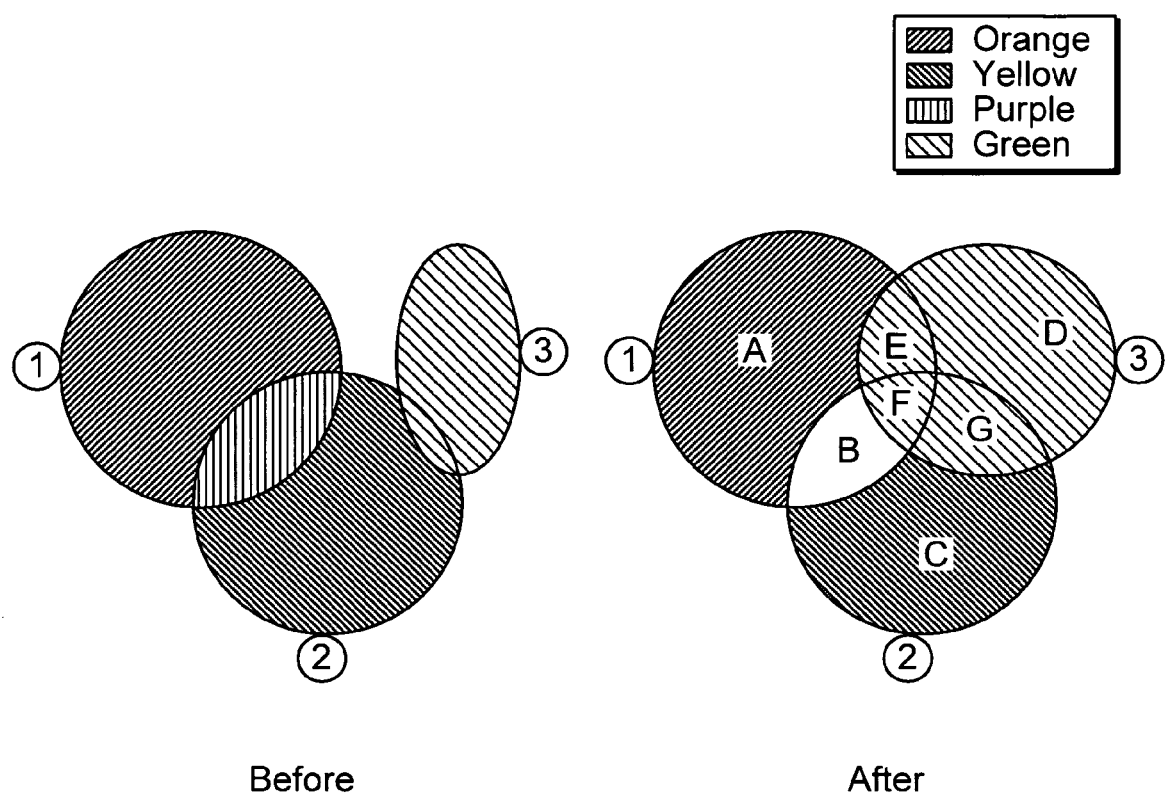
FIG. 6 illustrates a drawing before and after a modification.

Another example is shown in FIG. 6. FIG. 6 illustrates a drawing before and after a modification. In this example, there is no apparent stacking order between paths 1 and 2. All regions are within paths with previous paths that apparently had color, so (504) passes for each one.

Regions A, C, D, E, and G: similar analysis as above.

Region B: Within paths 1 and 2. Neither can be removed because neither is below the other. The set has 2 elements, so (509) does not apply. Paths 1 and 2 were not previously disjoint (they contained the purple region) so (512) does not apply. A color is not assigned to region B at this time.

Region F: Within paths 1, 2, and 3. Remove path 2 because it was below path 3, leaving paths 1 and 3. Paths 1 and 3 previously had no regions in common, and path 3 is different from the previous path, so assign path 3's color (green).

Figure 7A:
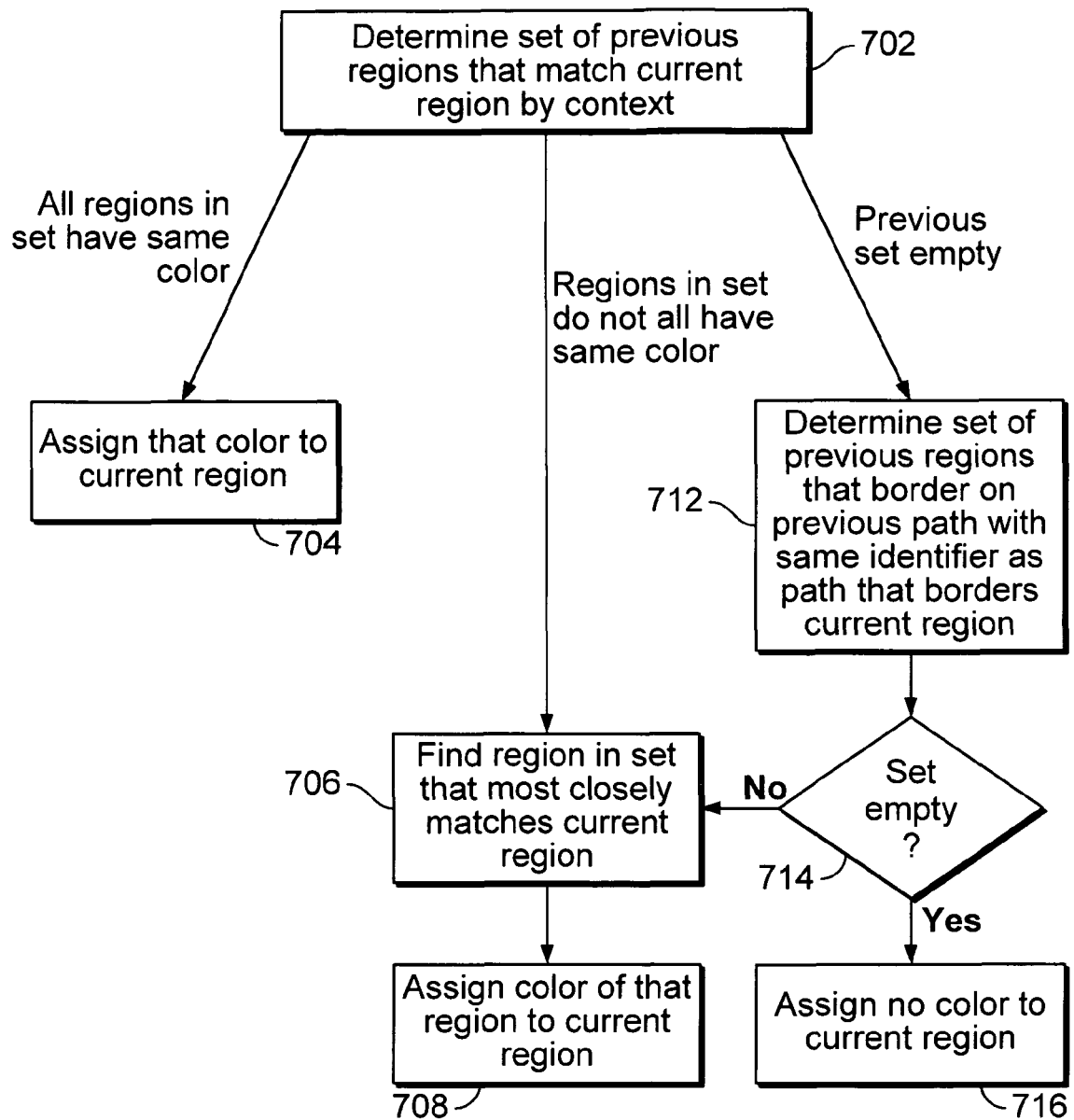
FIG. 7A is a flowchart illustrating a process of analyzing and assigning colors to current regions.

FIG. 7A is a flowchart illustrating a process of analyzing and assigning colors to current regions. In some embodiments, this process can be used to perform (212)-(218). In some embodiments, this process is performed for each current region that was not assigned a color after performing the process of FIG. 5A. In this example, geometric attributes of regions are compared.

In this example, a set of previous regions that match the current region by context is determined (702). For example, given two context entries E1 and E2, one for a boundary of a previous region, and one for a boundary of a current region, the entries match if they satisfy the following:

1. They have the same path identifier.
2. If the previous path and the current path with that identifier are both closed, they have the same value for inside/outside.
3. If either the previous path or the current path are open, or if they both are open, they have the same value for left/right/both.

A previous region R1 and a current region R2 "match by context" if every context entry for R1 has a matching context entry for R2, and every context entry for R2 has a matching context entry for R1.

If the set of previous regions that match by context contains only regions that had the same color (including the case where there is only one region in the set), then that color is assigned to the current region (704).

Figure 7B:
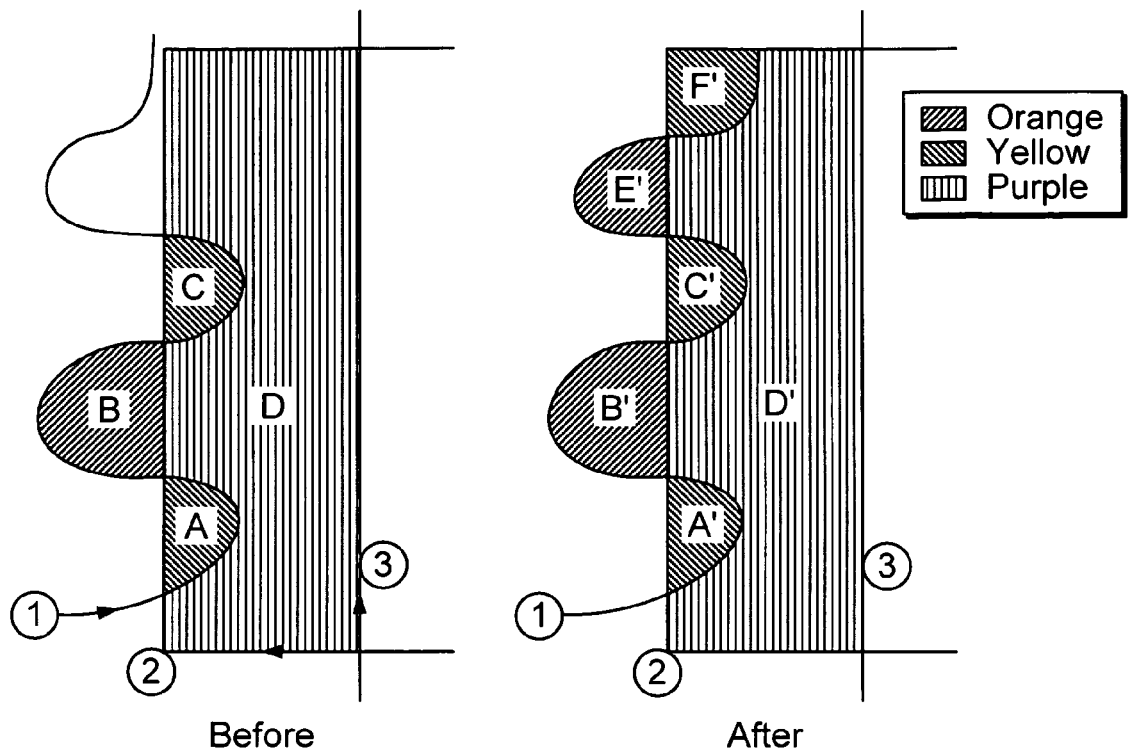
FIG. 7B illustrates a drawing before and after a modification.

For example, FIG. 7B illustrates a drawing before and after a modification. In this example, current regions A', B', and C' are already assigned colors according to (248)-(254) because their contexts are identical to the corresponding previous regions.

Region D' has the context to the right of path 1 (3 times), to the right of path 2 (4 times), and to the left of path 3. There is only one previous region with a matching context, region D, so region D's color, purple, is assigned to D'. (Note that region D has different numbers of context entries; it has to the right of path 1 twice, and to the right of path 2 3 times. But every entry for D' has a matching entry for D, and every entry for D has a matching entry for D'

Region E' has the context to the right of path 1, to the left of path 2. There is only one previous region with a matching context, region B, so region B's color, orange, is assigned to E'.

Region F' has the context to the left of path 1, to the right of path 2. There two previous regions with a matching context, regions A and C, but they have the same color (yellow), so that color is assigned to F'.

Returning to (702) in FIG. 7A, if the set of previous regions that match by context contains regions that do not all have the same color, the region in the previous set that most closely matches the current region is found (706). In some embodiments, (706) is performed according to the process of FIG. 10A, as more fully described below. The color of the previous region having the closest match is assigned to the current region (708).

Figure 8:
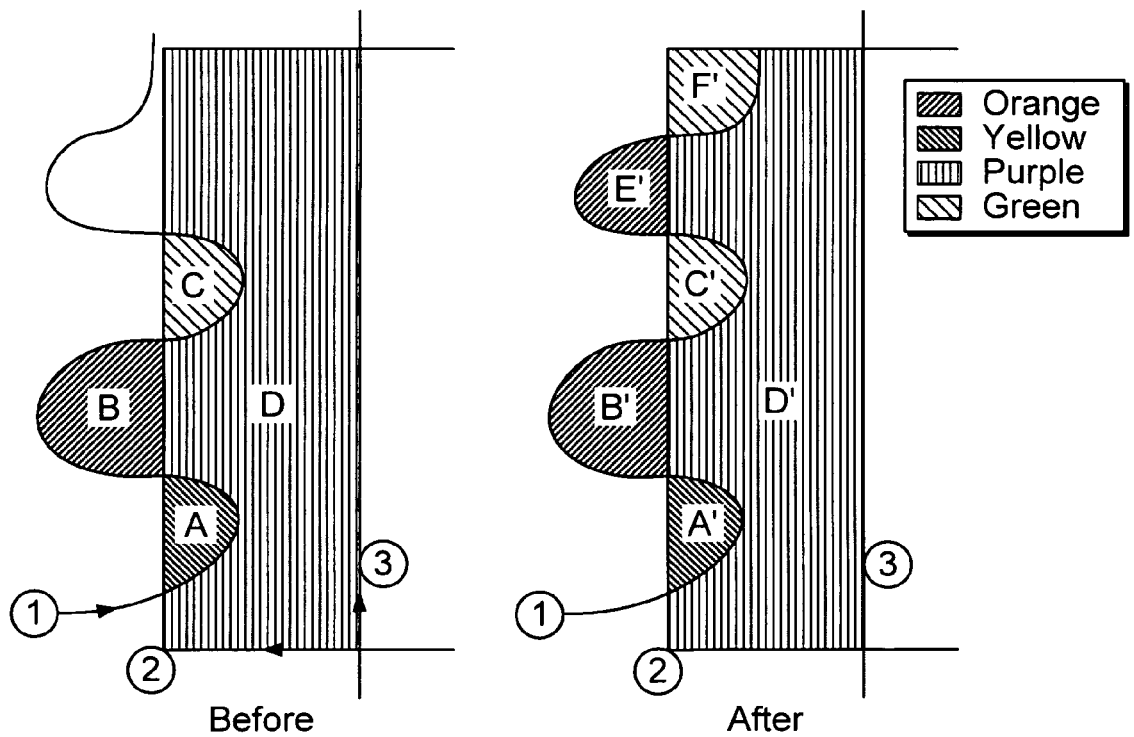
FIG. 8 illustrates an example of a drawing before and after an edit.

For example, FIG. 8 illustrates an example of a drawing before and after an edit. In this example, previous regions A and C have different colors. In the after drawing, regions C' and F' have a context matching both A and C, but they most closely match C, so they are assigned its color (green). All other regions are colored as in FIG. 7.

Returning to (260) in FIG. 7A, if the set of previous regions that match by context contains no regions, a set is constructed of all previous regions that border on any previous path with the same identifier as a path that borders the current region (712). If this set is empty, the current region is assigned no color (716). If this set is not empty, the region in it that most closely matches the current region is found (706). In some embodiments, (706) is performed according to the process of FIG. 10A, as more fully described below. The color of that region is assigned to the current region (708).

Figure 9:
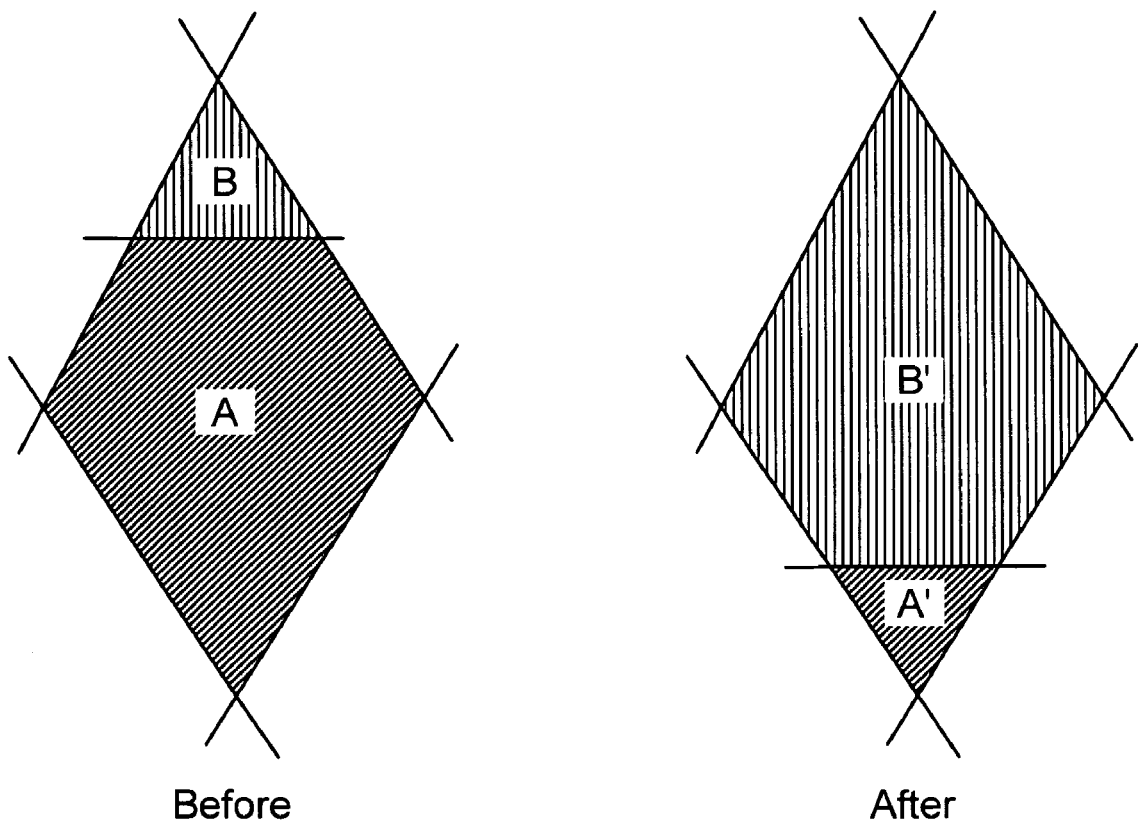
FIG. 9 illustrates an example of a drawing before and after a modification.

For example, FIG. 9 illustrates an example of a drawing before and after a modification. In this example, neither A' nor B' have a context that exactly matches any previous region. However, of the regions that border a path bounding A', region A most closely matches A', so A' is assigned the color of A (orange). Of the regions that border a path bounding B', region B most closely matches B', so B' is assigned the color of B (purple).

Figure 10A:
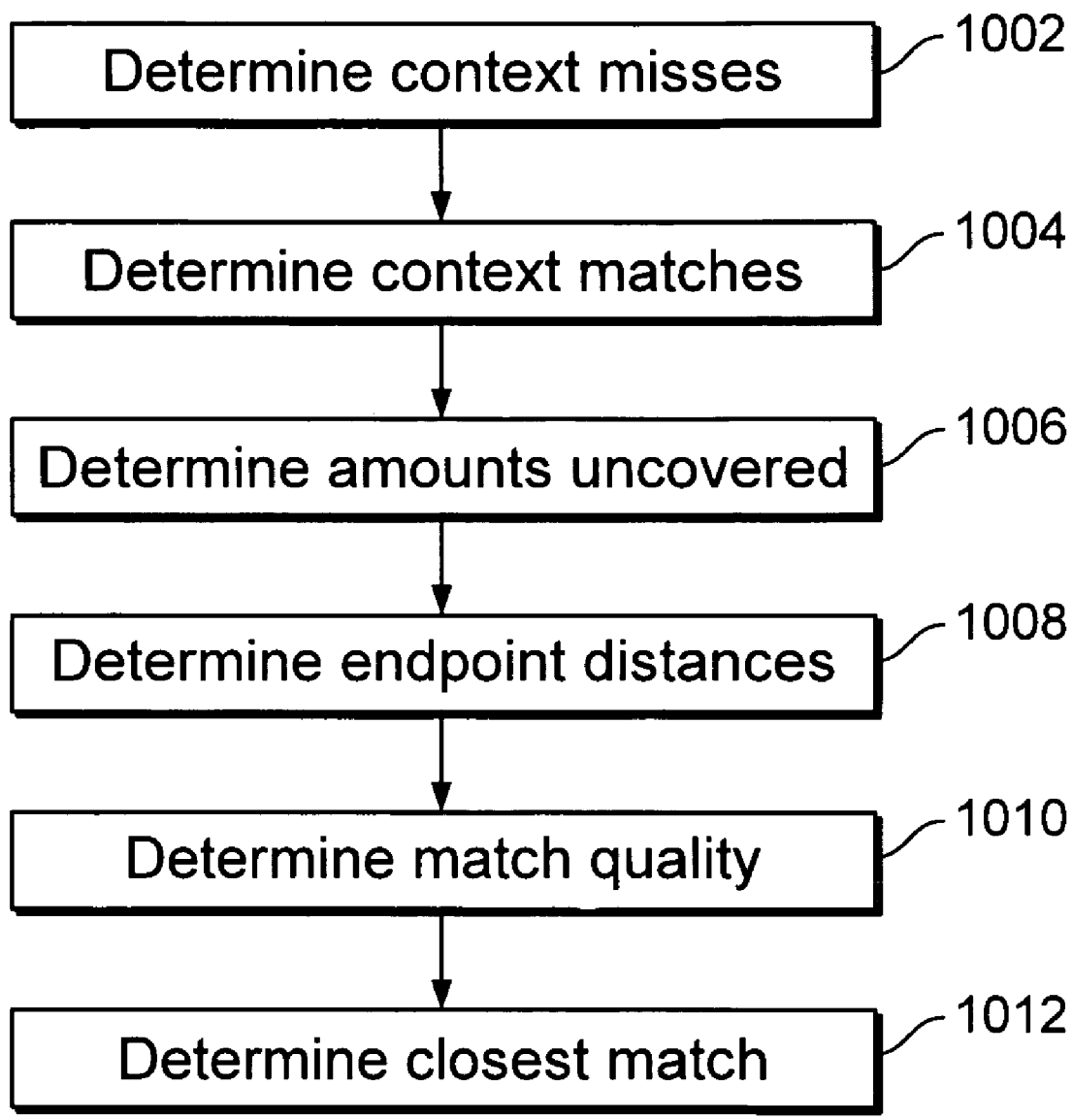
FIG. 10A is a flowchart illustrating a matching method.

FIG. 10A is a flowchart illustrating a matching method. In some embodiments, this process is used to find a previous region that most closely matches a current region by context (706). In this example, a previous and a current region are compared as follows.

Context misses are determined (1002). In some embodiments, for each path that borders both the previous region and the current region, there is a context miss if any of these hold true:

1. The previous and current paths are both closed, and the region is either inside the current and outside the previous, or outside the current and inside the previous.
2. Either the previous path, the current path, or both are open, and the current region is to the right of the current path, and the previous region is to the left of the previous path and not on both sides of the previous path.
3. Either the previous path, the current path, or both are open, and the current region is to the left of the current path, and the previous region is to the right of the previous path and not on both sides of the previous path.

A region can have as many context misses as it has edges.

Context matches are determined (1004). In some embodiments, for each path that borders both the previous and current region, there is a context match if any of these hold true:

1. The previous and current paths are both closed, and the region is either inside both the previous and current paths, or outside both the previous and current paths.
2. Either the previous path, the current path, or both are open, and the current region is to the right of the current path, and the previous region is to the right of the previous path or on both sides of the previous path.
3. Either the previous path, the current path, or both are open, and the current region is to the left of the current path, and the previous region is to the left of the previous path or on both sides of the previous path.

A region can have as many context matches as it has edges.

Figure 10B:
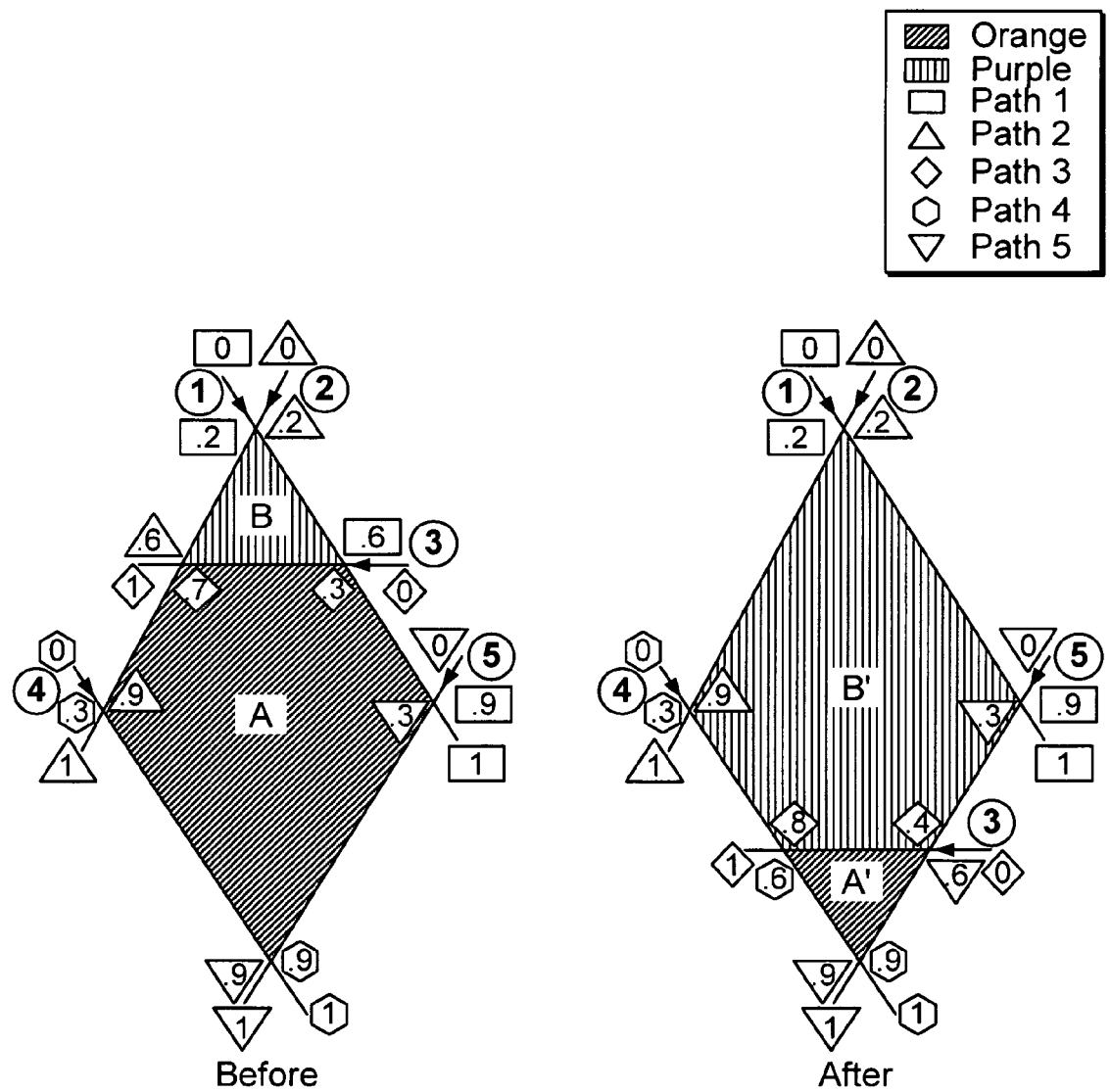
FIG. 10B illustrates a drawing before and after an edit.

For example, FIG. 10B illustrates a drawing before and after an edit. In this example, context misses and context matches are determined between each current region and each previous region.

Compare previous region A to current region A':
A' is to the left of path 3, so is A=>1 context match
A' is to the left of path 4, so is A=>1 context match
A' is to the right of path 5, so is A=>1 context match
A' compared to A gives 3 context matches, and 0 context misses. Note that paths 1 and 2, that border A but not A', do not contribute to the match/miss count.

Compare previous region B to current region A':
A' is to the left of path 3, B is to the right=>1 context miss
A' compared to B gives 0 context matches, and 1 context miss. Note that paths 1 and 2, that border B but not A', and 4 and 5, that border A' but not B, do not contribute to the match/miss count.

Compare previous region A to current region B':
B' is to the right of path 1, so is A=>1 context match
B' is to the left of path 2, so is A=>1 context match B' is to the right of path 3, A is to the left=>1 context miss
B' is to the left of path 4, so is A=>1 context match
B' is to the right of path 5, so is A=>1 context match
B' compared to A gives 4 context matches, and 1 context miss.

Compare previous region B to current region B':
B' is to the right of path 1, so is B=>1 context match
B' is to the left of path 2, so is B=>1 context match
B' is to the right of path 3, so is B=>1 context match
B' compared to B gives 3 context matches and 0 context misses. Note that paths 4 and 5, that border B' but not B, do not contribute to the match/miss count.

Figure 11:
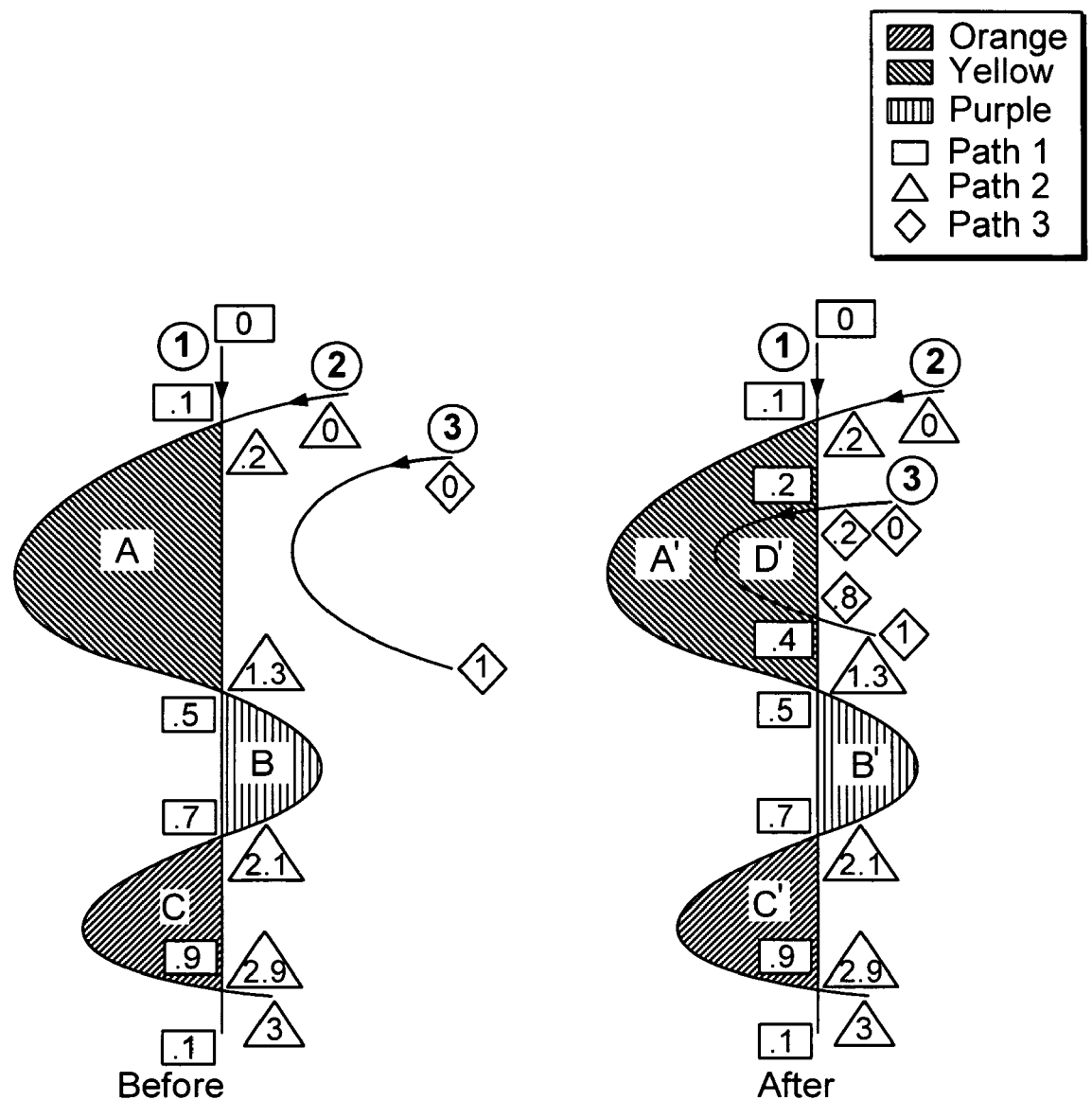
FIG. 11 illustrates a drawing before and after a modification.

FIG. 11 provides another example of determining context misses and matches. FIG. 11 illustrates a drawing before and after a modification. In this example, current regions B' and C' are already assigned colors according to (248)-(254) since B' and C' have exact matches (i.e., their contexts are identical to the corresponding previous regions).

Compare A to A': 2 context matches (paths 1 and 2), 0 context misses.
Compare B to A': 0 context matches, 2 context misses (paths 1 and 2).
Compare C to A': 2 context matches (paths 1 and 2), 0 context misses.
Compare A to D': 1 context match (path 1), 0 context misses
Compare B to D': 0 context matches, 1 context miss (path 1)
Compare C to D': 1 context match (path 1), 0 context misses Returning to FIG. 10A, amounts uncovered are determined (1006). In some embodiments, the amount uncovered is determined as follows: Start with 0. Look at each edge bordering the current region that does not have the region on both sides. Each such edge is defined by a portion of a path with parameterization t1 to t2. If that path does not have the previous region on the same side of it (left or right) as the current path, the range t1 to t2 is said to be completely uncovered in the previous region, and 100% is added to the total amount uncovered. If that path does have the previous region on the same side of it (left or right), look at each parameterization range t1' to t2' for a segment of the path that borders the previous region on the same side, and determine what part of the range t1 to t2 is covered by t1' to t2'. Add the fraction of t1 to t2 that remains uncovered after looking at all previous paths to the total amount uncovered. The total amount uncovered is a real number that can vary from 0 (each current edge is completely covered by the paths bordering the previous region) to the number of edges (each current edge is completely uncovered by the paths bordering the previous region.)

For example, in FIG. 10B, the parameterization values at each intersection are shown in the same color as the curve's identifying number.

Compare previous region A to current region A':
The edge of current path 3 between 0.4 and 0.8 is 25% uncovered by the edge of previous path 3 between 0.3 and 0.7. (i.e., the range 0.3 to 0.7 leaves only 25% of the range 0.4 to 0.8 uncovered.
The edge of current path 4 between 0.6 and 0.9 is 0% uncovered by the edge of previous path 4 between 0.3 and 0.9
The edge of current path 5 between 0.6 and 0.9 is 0% uncovered by the edge of previous path 5 between 0.3 and 0.9
A' is 25% uncovered by A.
Compare previous region B to current region A':
The edge of 3 between 0.4 and 0.8 is 100% uncovered (A is on the other side of path 3, and coverage only happens when regions are on the same side.)
The edge of current path 4 between 0.6 and 0.9 is 100% uncovered (4 does not border B).
The edge of current path 5 between 0.6 and 0.9 is 100% uncovered (5 does not border B).
A' is 300% uncovered by B.
Compare previous region A to current region B':
The edge of 1 between 0.2 and 0.9 is 57% uncovered by 0.6 to 0.9
The edge of 2 between 0.2 and 0.9 is 57% uncovered by 0.6 to 0.9
The edge of 3 between 0.4 and 0.8 is 100% uncovered (wrong side).
The edge of 4 between 0.3 and 0.6 is 0% uncovered by 0.3 to 0.9
The edge of 5 between 0.3 and 0.6 is 0% uncovered by 0.3 to 0.9
B' is 212% uncovered by A.
Compare previous region B to current region B':
The edge of 1 between 0.2 and 0.9 is 43% uncovered by 0.2 to 0.6
The edge of 2 between 0.2 and 0.9 is 43% uncovered by 0.2 to 0.6
The edge of 3 between 0.4 and 0.8 is 25% uncovered by 0.3 to 0.7
The edge of 4 between 0.3 and 0.6 is 100% uncovered (4 does not border B).
The edge of 5 between 0.3 and 0.6 is 100% uncovered (5 does not border B).
B' is 311% uncovered by B.

In another example, amount uncovered is determined for the example of FIG. 11:
A' is 100% uncovered by A (the edge of A' defined by path 3 is completely uncovered, the other 3 completely covered. Note especially that there are two edges in A' defined by path 1, and each of them is completely covered by the portion of path 1 that bounds A.)
A' is 400% uncovered by B and by C.
D' is 100% uncovered by A (the edge of D' defined by path 3 is completely uncovered, the edge by path 1 completely covered.
D' is 200% uncovered by B and by C.

Returning to FIG. 10A, endpoint distances are determined (1008). In some, embodiments, endpoint distance is determined as follows: Start with 1. For each edge bordering the current region, find all edges bordering the previous region that are portions of the same path. Assume the current edge is defined by the parameterization range t1 to t2 of the path, and the previous edge was defined by range t1' to t2' of the path. Compute the quantity (t1-t1')*(t1-t1')+(t2-t2')*(t2-t2'). If there are multiple edges meeting this, take the one with the smallest quantity. If this is not 0, multiply the total endpoint distance by this. The total endpoint distance is a real number that can vary from 0 to any large value.

For example, in FIG. 10B, endpoint distance can be determined as follows:
Compare previous region A to current region A':
Path 3: (0.4−0.3)*(0.4−0.3)+(0.8−0.7)*(0.8−0.7)=0.02
Path 4: (0.6−0.3)*(0.6−0.3)+(0.9−0.9)*(0.9−0.9)=0.09
Path 5: (0.6−0.3)*(0.6−0.3)+(0.9−0.9)*(0.9−0.9)=0.09
The endpoint distance between A and A' is 0.02*0.09*0.09=0.000162
Compare previous region B to current region A':
Path 3: (0.4−0.3)*(0.4−0.3)+(0.8−0.7)*(0.8−0.7)=0.02
Path 4: does not border B.

Path 5: does not border B.
The endpoint distance between B and A' is 0.02
Compare previous region A to current region B':
Path 1: (0.2−0.6)*(0.2−0.6)+(0.9−0.9)*(0.9−0.9)=0.16
Path 2: (0.2−0.6)*(0.2−0.6)+(0.9−0.9)*(0.9−0.9)=0.16
Path 3: (0.4−0.3)*(0.4−0.3)+(0.8−0.7)*(0.8−0.7)=0.02
Path 4: (0.3−0.3)*(0.3−0.3)+(0.6−0.9)*(0.6−0.9)=0.09
Path 5: (0.3−0.3)*(0.3−0.3)+(0.6−0.9)*(0.6−0.9)=0.09
The endpoint distance between A and B' is 0.0000041472
Compare previous region B to current region B':
Path 1: (0.2−0.2)*(0.2−0.2)+(0.9−0.6)*(0.9−0.6)=0.09
Path 2: (0.2−0.2)*(0.2−0.2)+(0.9−0.6)*(0.9−0.6)=0.09
Path 3: (0.4−0.3)*(0.4−0.3)+(0.8−0.7)*(0.8−0.7)=0.02
Path 4: does not border B.
Path 5: does not border B.
The endpoint distance between B and B' is 0.000162

In the example of FIG. 11, endpoint distance can be determined as follows:
Endpoint distance between A and A'
Path 1: (0.1−0.1)*(0.1−0.1)+(0.2−0.5)*(0.2−0.5)=0.0009
Path 2: 0; not multiplied in because it's 0.
total=0.0009
Endpoint distance between B and A'
Path 1: (0.1−0.5)*(0.1−0.5)+(0.2−0.7)*(0.2−0.7)=0.2
Path 2: (0.2−1.3)*(0.2−1.3)+(1.3−2.1)*(1.3−2.1)=1.74
total=0.348
Endpoint distance between C and A':
Path 1: (0.1−0.7)*(0.1−0.7)+(0.2−0.9)*(0.2−0.9)=0.85
Path 2: (0.2−2.1)*(0.2−2.1)+(1.3−2.9)*(1.3−2.9)=12.02
total=10.217
Endpoint distance between A and D'
Path 1: (0.2−0.1)*(0.2−0.1)+(0.4−0.5)*(0.4−0.5)=0.02
total=0.02
Endpoint distance between B and D'
Path 1: (0.2−0.5)*(0.2−0.5)+(0.4−0.7)*(0.4−0.7)=0.18
total=0.18
Endpoint distance between C and D':
Path 1: (0.2−0.7)*(0.2−0.7)+(0.4−0.9)*(0.4−0.9)=0.5
total=0.5

A match quality is determined (1010). For example, the quality of the match between the previous region and the current region could be based on one of more of the following: context misses, context matches, amount uncovered, and endpoint distance. The match quality could be determined quantitatively or qualitatively. In some embodiments, the following rules are weighed in approximately the following order:

1. The fewer context misses, the better the match. For example, having colors jump to the other sides of paths is undesirable.
2. The more context matches, the better the match. For example, context matches tend to describe paths that are similar.
3. The smaller the total amount uncovered, the better the match. For example, the path whose edges cover more of the current region is generally a better match.
4. The smaller the endpoint distance, the better the match. For example, a region with a smaller endpoint distance is a closer match along the defining paths than a region with a larger endpoint distance.

In some embodiments, a quantitative metric is calculated based on the above rules. In some embodiments, no one criterion completely eliminates any other criterion.

Comparing a current region R with previous regions S and T, S would be a better match if it had fewer context misses than T. However, if T has many more context matches than S, this can outweigh the context miss metric.

The closest match is determined (1012). In some embodiments, each current region and each previous region is compared according to (1002)-(1010). For each current region, the previous region with the best match quality is the previous region that most closely matches the current region.

For example, in FIG. 10B, it is determined whether A or B is a better match for A'.
A: 0 context misses, 3 context matches, 25% uncovered, endpoint distance 0.000162
B: 1 context miss, 0 context matches, 300% uncovered, endpoint distance 0.02.
A is better on all metrics. A is a better match than B.
It is determined whether A or B is a better match for B'.
A: 1 context miss, 4 context matches, 212% uncovered, endpoint distance 0.0000041472.
B: 0 context misses, 3 context matches, 311% uncovered, endpoint distance 0.000162.
In this example, B is better on the context miss metric but worse on the other metrics. However, the context miss metric is weighed more heavily, and the others are not sufficiently better to outweigh this, so B is still the better match in this example.

In the example of FIG. 11, it is determined whether A, B, or C is a better match for A':
A: 0 context misses, 2 context matches, 100% uncovered, endpoint distance 0.0009
B: 2 context misses, 0 context matches, 400% uncovered, endpoint distance 1.74
C: 0 context misses, 2 context matches, 400% uncovered, endpoint distance 12.02
In this example, B is eliminated because A and C tie on the context misses and matches. However, A leaves much less uncovered and has a much better endpoint distance. A is the best match in this example.

It is determined whether A, B, or C is a better match for B':
A: 0 context misses, 1 context match, 100% uncovered, endpoint distance 0.02
B: 1 context miss, 0 context matches, 200% uncovered, endpoint distance 0.18
C: 0 context misses, 1 context match, 200% uncovered, endpoint distance 0.5
In this example, B is eliminated because of the context misses and matches, A and C tie on this. But A leaves less uncovered and has a better endpoint distance. A is the best match in this example.

Apparent Color and Relative Stacking Order of Closed Paths

Figure 12:
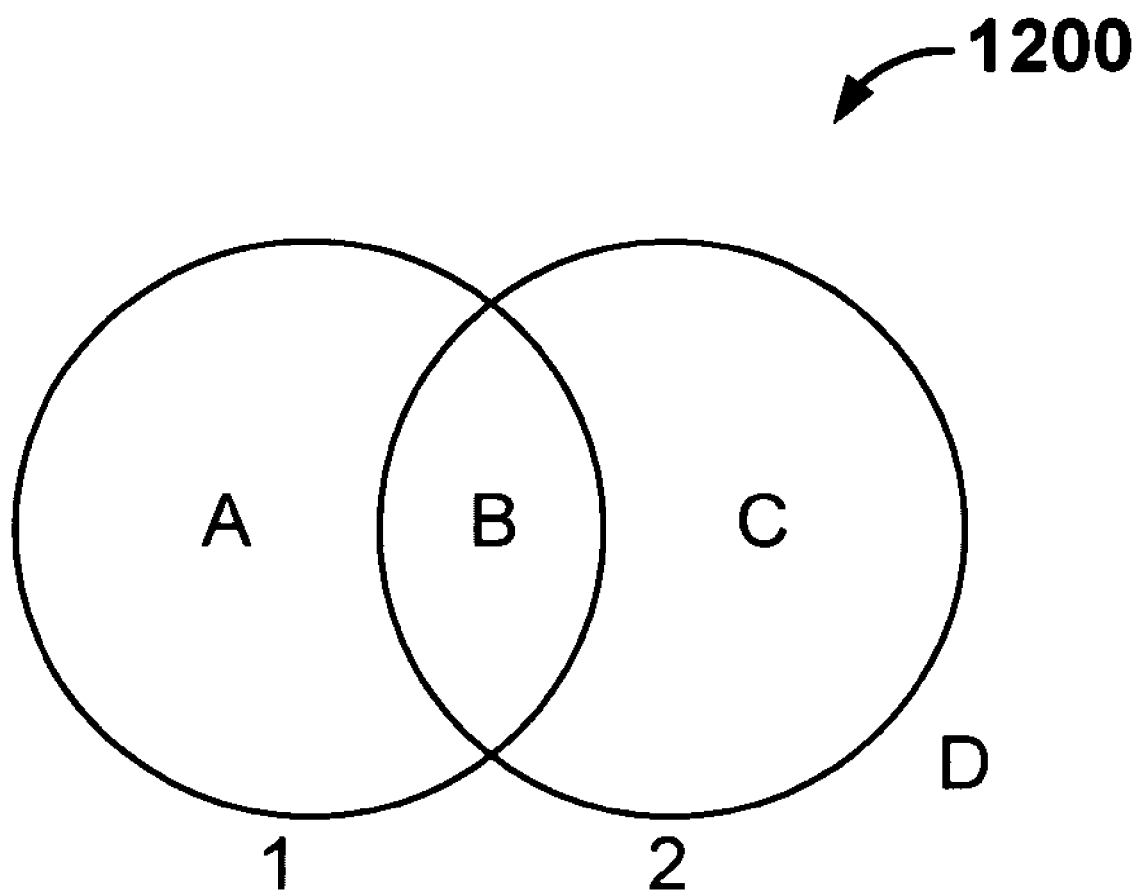
FIG. 12 illustrates an example of intersecting closed paths.

FIG. 12 illustrates an example of intersecting closed paths. The regions formed by the intersection of closed paths can be colored so that it appears that the paths are opaque colored shapes partially overlapping each other. As previously described, the color associated with a closed path refers to the color associated with a shape formed by the closed path, and not necessarily the color of the path itself.

By analyzing the paths and colors of the regions, it is possible to assign colors and stacking orders to the paths so that if the paths were opaque, colored, overlapping shapes, the appearance would be the same. In some embodiments, the assigned colors and stacking orders are used to assign colors to current regions, as described in FIG. 5A.

A set of closed paths define a set of regions by their intersections. In this example, drawing 1200 is shown to include paths 1 and 2. Paths 1 and 2 define four regions: A, which is inside 1 but not 2; B, which is inside both 1 and 2; C, which is inside 2 but not 1; and D, which is inside neither A nor B. For purposes of explanation, regions that are not inside any of the paths are not described in these examples.

A set of colors can be assigned to the regions defined by the paths. The regions and colors assigned to them can be analyzed, and colors and stacking order can be assigned to the paths consistent with the coloring. In some embodiments, the stacking order derived is the order consistent with the paths being opaquely filled paths that block out the regions and colors of other paths that are below them in the stack.

Figure 13:
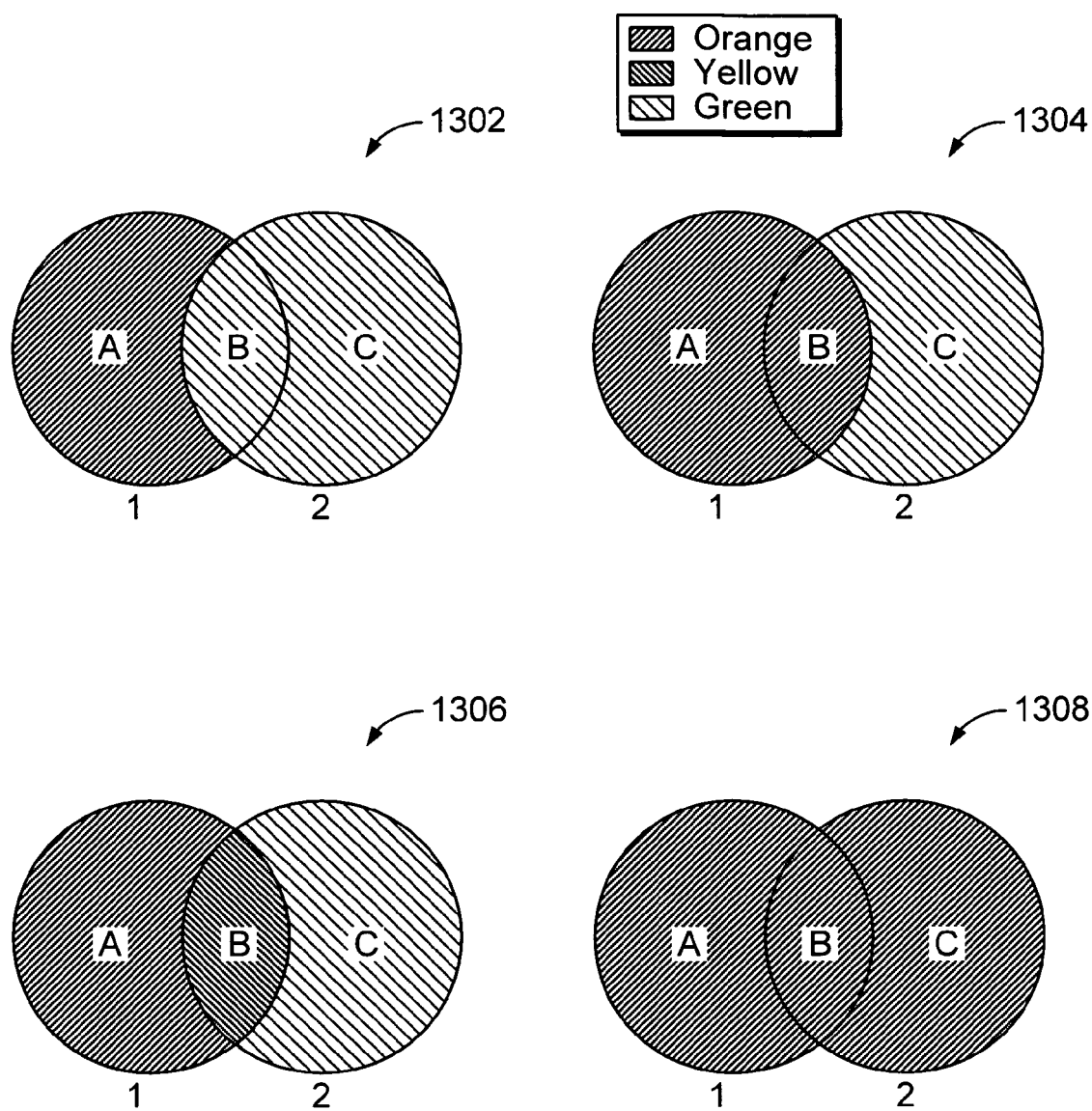
FIG. 13 illustrates various ways in which regions can be colored.

FIG. 13 illustrates various ways in which regions can be colored. In drawing 1302, region A has been assigned orange, and regions B and C have been assigned green. The apparent colors and stacking order are: path 1 being orange, path 2 being green, with path 2 being above path 2. (Note, in this and all figures, the paths involved have been drawn to make them visible. The stacking order and colors may be more obvious if the drawn paths are ignored.)

In drawing 1304, region B has been assigned orange instead of green. The apparent colors are still path 1 being orange and path 2 being green, but now path 1 appears to be above path 2 in the stacking order.

Some colorings do not produce all results. In drawing 1306, the apparent colors are still path 1 being orange and path 2 being green, but path 1 appears to be neither above nor below path 2.

In drawing 1308, the apparent colors are both path 1 and 2 being orange, but it is not apparent whether path 1 is above or below path 2.

Figure 14:
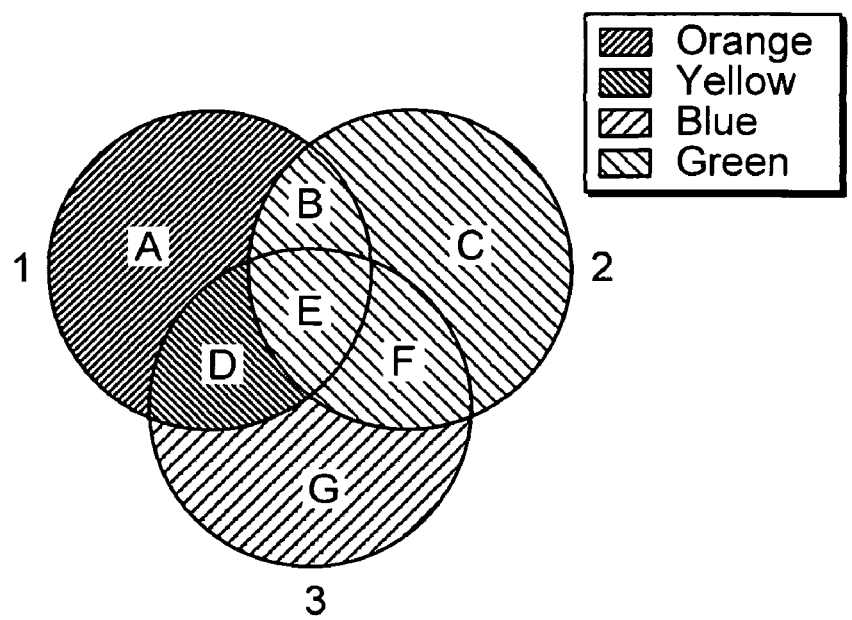
FIG. 14 illustrates a set of intersecting paths defining a set of colored regions.

FIG. 14 illustrates a set of intersecting paths defining a set of colored regions. In this example, path 1 appears to be orange, path 2 appears to be green, and path 3 appears to be blue. Path 2 appears to be above path 1 and path 3, but path 1 and 3 appear to have no stacking order.

Figure 15:
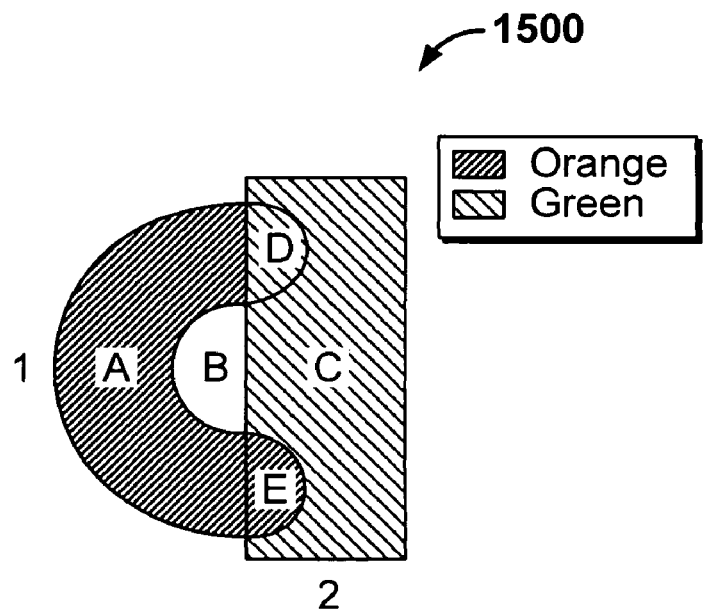
FIG. 15 illustrates another set of intersecting paths defining a set of colored regions.

FIG. 15 illustrates another set of intersecting paths defining a set of colored regions. In this example, drawing 1500 shows how stacking can appear to be ambiguous in the presence of non-convex paths. Path 1 appears to be orange and path 2 appears to be green, but path 1 appears to be both above and below path 2. (Region B in this figure is outside all paths, and so is not considered here).

Figure 16:
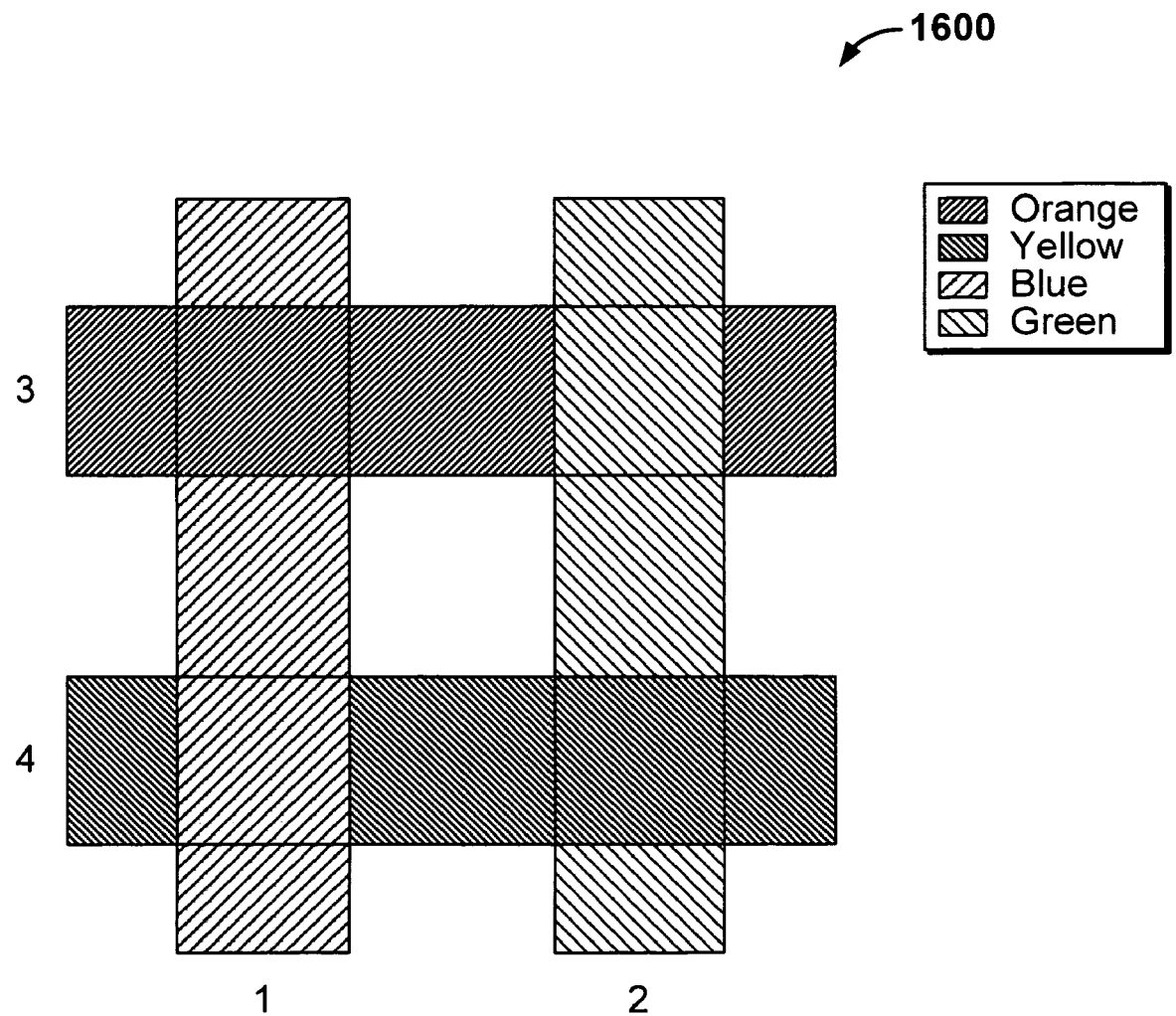
FIG. 16 illustrates another set of intersecting paths defining a set of colored regions.

FIG. 16 illustrates another set of intersecting paths defining a set of colored regions. In this example, drawing 1600 shows that the apparent stacking order is not necessarily transitive or complete. Path 1 appears to be above path 4, path 4 appears to be above path 2, path 2 appears to be above path 3, and path 3 appears to be above path 1. There is no apparent stacking order between path 1 and path 2, and no apparent stacking order between path 3 and path 4.

Figure 17:
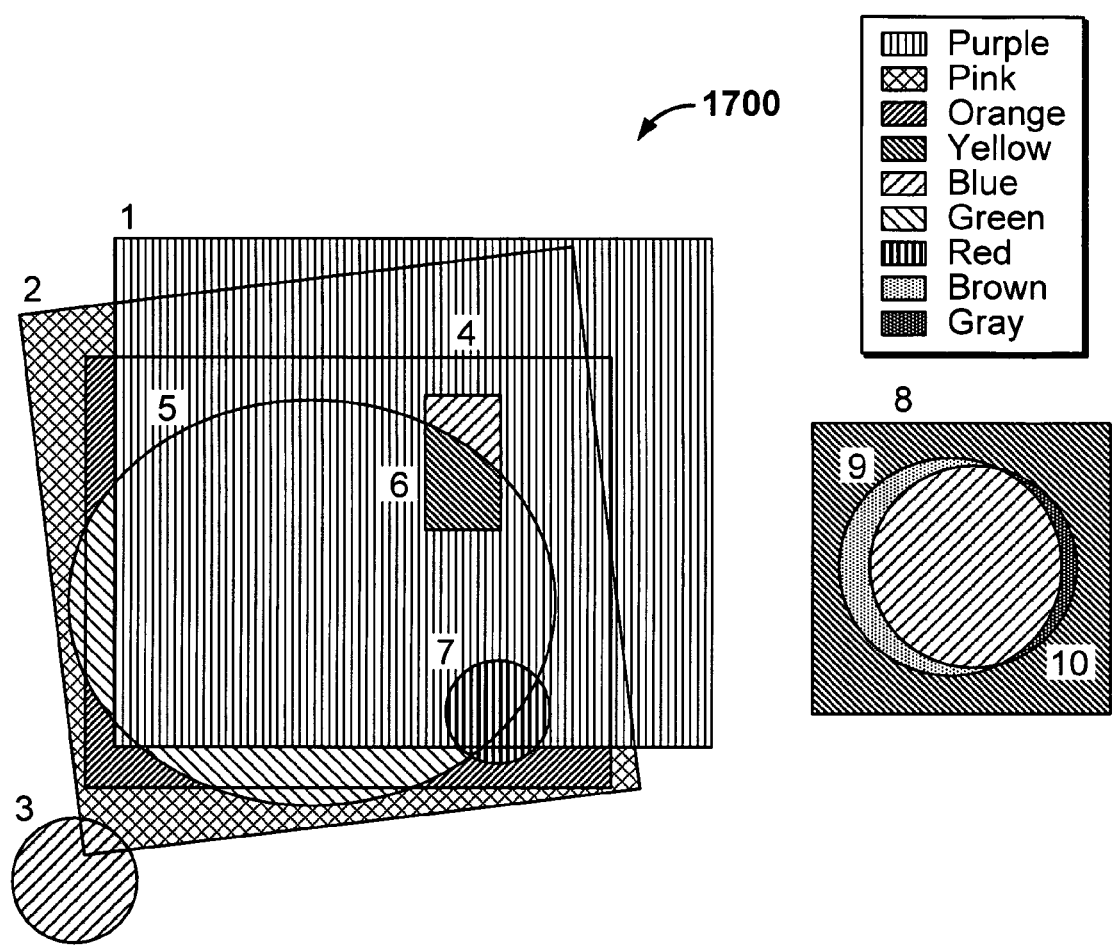
FIG. 17 illustrates a plurality of paths defining a plurality of regions.

FIG. 17 illustrates a plurality of paths defining a plurality of regions. In this example, drawing 1700 is shown to include closed paths 1-10.

Figure 18:
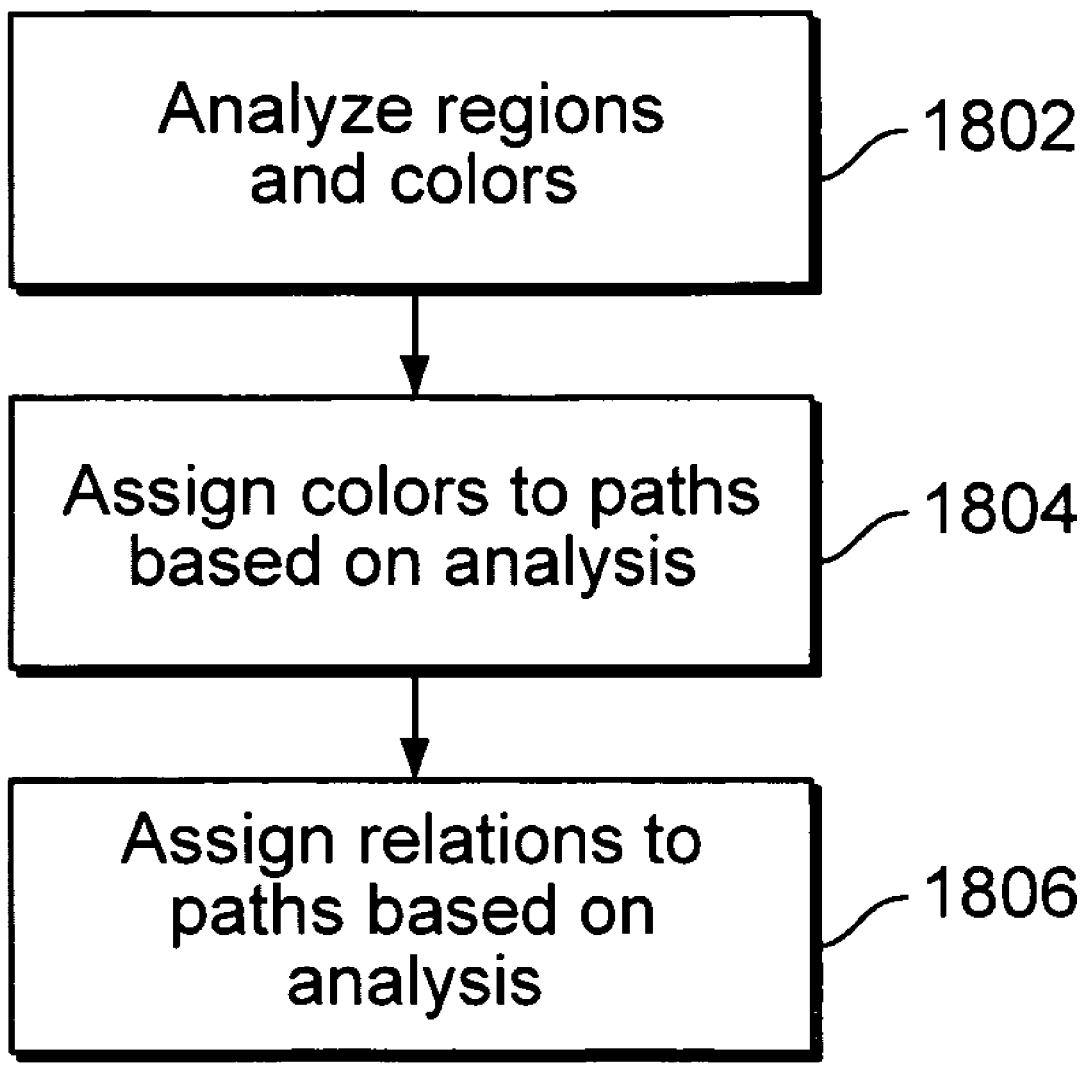
FIG. 18 is a flowchart illustrating a method of deriving apparent colors and stacking orders for paths in a drawing.

FIG. 18 is a flowchart illustrating a method of deriving apparent colors and stacking orders for paths in a drawing. A set of closed paths can define a set of regions, with each region associated with a color. In this example, the colors applied to the regions are analyzed (1802). Color is assigned to one or more of the paths based on the analysis (1804). A relation is assigned to one or more of the paths (1806). For example, a relation could include stacking order (e.g., "path A is above path B").

Figure 19:
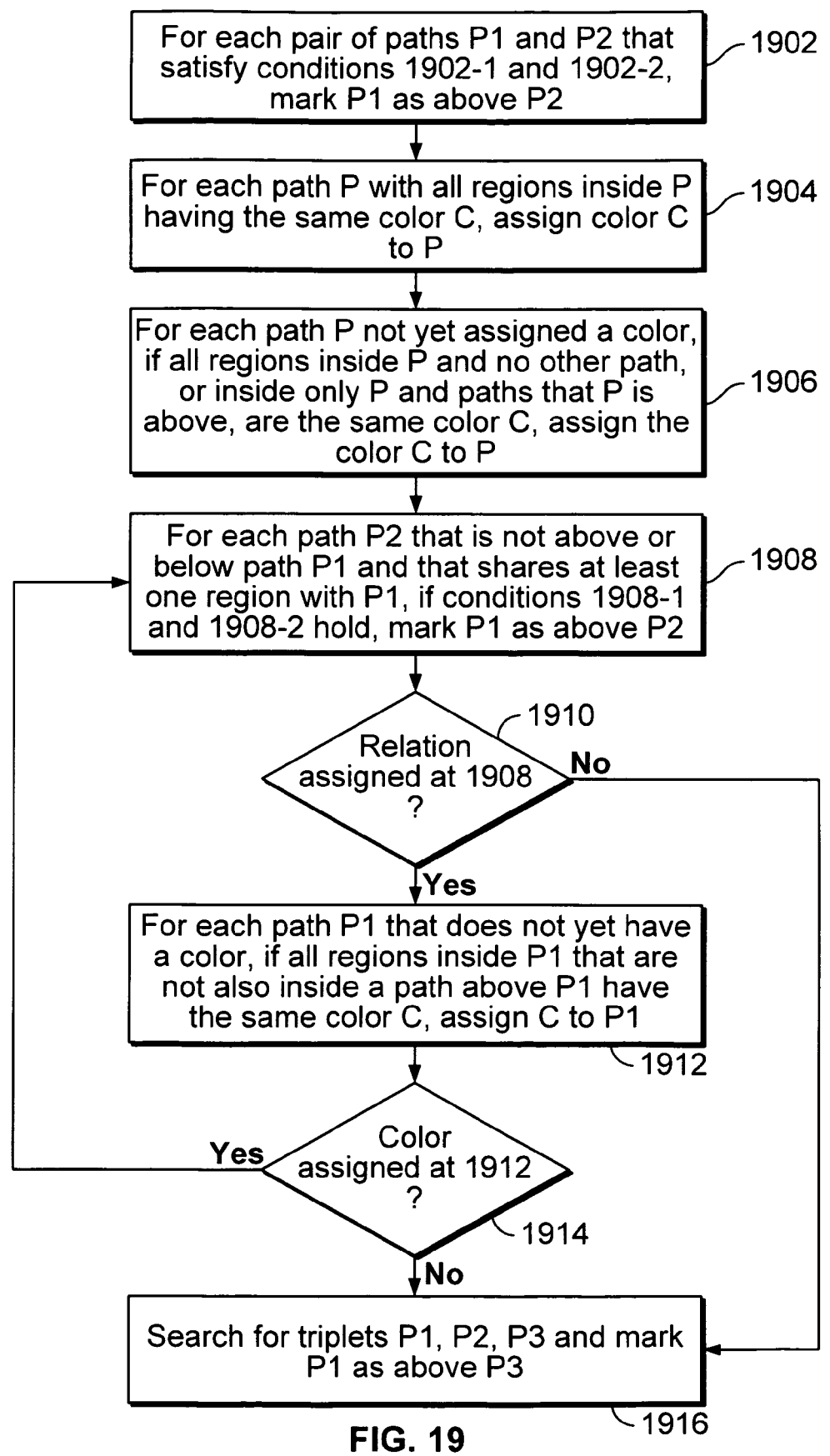
FIG. 19 is a flowchart illustrating a method of deriving apparent colors and stacking orders for regions in a drawing.

FIG. 19 is a flowchart illustrating a method of deriving apparent colors and stacking orders for regions in a drawing.

Each pair of paths P1 and P2 is found such that the following conditions are satisfied:

1902-1. Every region in P1 is also a region in P2

1902-2. For every boundary separating a region inside P1 from an adjacent region outside P1, the regions on the two sides of the boundary are different colors.

For every such pair of paths, P1 is marked (or assigned) as being above P2 (1902). As used herein, P1 is above P2 or P2 is below P1 means that a path P1 is marked as being above a path P2.

There are various rules possible for determining if a region is inside or outside of a path. For example, a region can be defined as inside if it contains a point that is inside using the nonzero-winding rule. A region can be defined as inside if it contains a point that is inside using the even-odd winding rule. For example, various descriptions of winding rules are provided in PostScript (R) Language Reference (3rd Edition), Adobe Systems Incorporated, Addison-Wesley, 1999.

Any such rule can be used, and there is no requirement that each path involved use the same rule. One path could define inside using the nonzero rule, and another could define inside using the even-odd rule. In some embodiments, the only requirement is that each path's rule is applied consistently throughout. Any region that is not inside a path can be said to be outside the path.

For each path, if all regions inside the path have the same color, that color is assigned to that path (1904).

For each path P that does not yet have a color assigned, if all regions that are inside P and no other path, or inside only P and paths that P is above, are the same color, that color is assigned to the path (1906).

At this point, a base set of paths has been assigned colors and a base set of paths has been assigned relations (e.g., stacking order).

For each path P1 that has a color assigned, the following is performed (1908):

For each path P2 that is not above or below P1 and that shares at least one region with P1, it is determined whether the following conditions both hold:

1908-1. All regions inside both P1 and P2, and that are not also inside a path that is above P1, and that border on P1 have the color of P1. In this example, a region borders a path if that path makes up part of the region's boundary. A region that borders a path can either be inside or outside a path that it borders.

1908-2. P2 has at least one region inside it that is outside P1, that borders on P1, and is a different color than P1.

If both conditions hold, then path P1 is marked as being above P2 (1908). In some embodiments, P1 is marked as being below P2, and "above" and "below" are swapped in this example. The labels chosen do not matter as long as they are consistently used.

It is determined whether a relation was assigned at 1908 (1910). If it is determined that an assignment was made, then for each path P1 that does not yet have a color, the following is performed:

Every region inside P1 that is not also inside a path that is above P1 is determined. If all such regions have the same color, then that color is assigned to P1 (1912).

It is determined whether a color was assigned at 1912 (1914). If it is determined that an assignment was made, the process returns to (1908). In some embodiments, (1908) is performed only for the paths that had colors assigned at 1912 (since (1908) was already performed for the base set of paths that were assigned colors). Similarly, if a relation is assigned at 1908 (1910), then (1912) is performed only for the paths that had relations assigned at 1908.

If it is determined in (1910) or (1914) that an assignment was not made, then the following is performed: The set of paths is searched for triples P1, P2, P3, such that P1 is above P2, P2 is above P3, P1 is not above P3, P3 is not above P1, and there is at least one region that is inside P1, P2, and P3. For each such triple found, P1 is marked as being above P3 (1916).

The following is an example of the process of FIG. 18 as applied to FIG. 14. The process begins at (1902) and it is determined that no such paths exist. At 1904, it is determined that all regions in path 2 are green. Path 2 is green.

At 1906, it is determined that all regions in path 1 that are not in any other path are orange. Path 1 is orange. All regions in path 3 that are not in any other path are blue. Path 3 is blue.

At 1908, it is determined that all regions inside both path 2 and 1, and that border on 2 are the color of path 2 (green). Path 1 has at least one region bordering path 2 that is outside path 2 and that is not the color of path 2 (green). Path 2 is above path 1.

All regions inside both path 2 and 3, and that border on 2 are the color of path 2 (green). Path 3 has at least one region bordering path 2 that is outside path 2 and that is not the color of path 2 (green). Path 2 is above path 3.

At 1910, it is determined that a relation was assigned at 1908. At 1912, it is determined that there is no path that does not yet have a color. At 1914, it is determined that a color was not assigned at 1912. At 1916, it is determined that there is no such set and the process ends.

The results are the following:
Path 1 is orange.
Path 2 is green.
Path 3 is blue.
Path 2 is above path 1.
Path 2 is above path 3.
No relative stacking has been assigned to paths 1 and 3.

The following is an example of the process of FIG. 18 as applied to FIG. 17.

At 1902, it is determined that every region in paths 9 and 10 is also in path 8. Path 9 is above path 8. Path 10 is above path 8. Every region in path 7 is also in paths 4 and 2. Path 7 is above path 4. Path 7 is above path 2. Every region in path 5 is also in path 2. Path 5 is above path 2. Every region in path 6 is also in paths 1, 2, and 4. Path 6 is above path 1. Path 6 is above path 2. Path 6 is above path 4.

At 1904, it is determined that all regions in path 3 are blue. Path 3 is blue. All regions in path 7 are red. Path 7 is red.

At 1906, it is determined that all regions in path 1 that are not in any other path are purple. Path 1 is purple. All regions in path 2 that are not in any other path are pink. Path 2 is pink. All regions in path 8 that are not in any other path are yellow. Path 8 is yellow. All regions in path 9 that are only also in paths 9 is above (path 8) are brown. Path 9 is brown. All regions in path 10 that are only also in paths 10 is above (path 8) are gray. Path 10 is gray.

At 1908, it is determined that all regions inside both path 7 and 1 and that border on 7 are the color of path 7 (red). Path 1 has at least one region bordering path 7 that is outside path 7 and that is not the color of path 7 (red). Path 7 is above path 1.

All regions inside both path 7 and 5 and that border on 7 are the color of path 7 (red). Path 5 has at least one region bordering path 7 that is outside path 7 and that is not the color of path 7 (red). Path 7 is above path 5.

All regions inside both path 1 and 2 and that border on 1 and are not in a path above 1 (path 7) are the color of path 1 (purple). Path 2 has at least one region bordering path 1 that is outside path 1 and that is not the color of path 1 (purple). Path 1 is above path 2.

All regions inside both path 1 and 4 and that border on 1 and are not in a path above 1 (path 7) are the color of path 1 (purple). Path 4 has at least one region bordering path 1 that is outside path 1 and that is not the color of path 1 (purple). Path 1 is above path 4.

All regions inside both path 1 and 5 and that border on 1 and are not in a path above 1 (path 7) are the color of path 1 (purple). Path 5 has at least one region bordering path 1 that is outside path 1 and that is not the color of path 1 (purple). Path 1 is above path 5.

All regions inside both path 3 and 2 and that border on 3 are the color of path 3 (blue). Path 2 has at least one region bordering path 3 that is outside path 3 and that is not the color of path 3 (blue). Path 3 is above path 2.

At 1910, it is determined that a relation was assigned at 1908.

At 1912, it is determined that all regions of path 5 that are not also regions of paths above it (paths 1 and 7) are the same color (green). Path 5 is green.

At 1914, it is determined that a color was assigned at 1912, so the process returns to (1908). In some embodiments, (1908) is only performed for path 5. At 1908, it is determined that all regions inside both path 5 and 4 and that border on 5 and are not in a path above 5 (paths 1 and 7) are the color of path 5 (green). Path 4 has at least one region bordering path 5 that is outside path 5 and that is not the color of path 5 (green). Path 5 is above path 4.

At 1910, it is determined that a relation was assigned at 1908, so (1912) is performed. In some embodiments, (1912) is only performed for path 4. At 1912, it is determined that all regions of path 4 that are not also regions of paths above it (paths 1, 5, and 7) are the same color (orange). Path 4 is orange.

At 1914, it is determined that a color was assigned at 1912, so the process returns to (1908). In some embodiments, (1908) is only performed for path 4. At 1908, it is determined that all regions inside both path 4 and 2 and that border on 4 and are not in a path above 4 (paths 1, 5, and 7) are the color of path 4 (orange). Path 2 has at least one region bordering path 4 that is outside path 4 and that is not the color of path 4 (orange). Path 4 is above path 2.

At 1910, it is determined that a relation was assigned at 1908, so (1912) is performed. In some embodiments, (1912) is only performed for path 2. At 1912, it is determined that path 2 already has a color, so no color is assigned. At 1914, it is determined that no color was assigned at 1912. The process proceeds to (1916). At 1916, it is determined that path 6 is above path 1, path 1 is above path 5, path 6 is not above path 5, path 5 is not above path 6, and paths 6, 1, and 5 share a face. Path 6 is above path 5.

The results are the following:
Path 1 is purple.
Path 2 is pink.
Path 3 is blue.
Path 4 is orange.
Path 5 is green.
Path 7 is red.
Path 8 is yellow.
Path 9 is brown.
Path 10 is gray.
Path 6 has no assigned color.
Path 1 is above paths 2, 4, and 5.
Path 3 is above path 2.
Path 4 is above path 2.
Path 5 is above paths 4 and 5.
Path 6 is above paths 1, 2, 4, and 5.
Path 7 is above paths 1, 2, 4, and 5.
Path 9 is above path 8.
Path 10 is above path 8.

In this example, no relative stacking order has been assigned to many pairs of paths, including 1 and 3, 4 and 5 and 3, 6 and 7, and 9 and 10.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   creating a drawing to define at least a first path and a second path, wherein the first path and the second path overlap, and wherein the first path has a first path attribute, and the second path has a second path attribute;
   determining a first overlapping region wherein the first path and the second path overlap;
   deriving, by a processor, an apparent stacking order for the first overlapping region, wherein the apparent stacking order is determined at least in part by:
   determining, by the processor, if (1) the first overlapping region and every region in the first path is also in the second path and (2) for every boundary separating the first overlapping region inside the first path from an adjacent region outside the first path, the first overlapping region and the adjacent region on the two sides of the boundary have the first path attribute and the second path attribute, respectively, designating said first path as above the second path in apparent stacking order; and
   else determining, by the processor, if (1) the first overlapping region and all regions inside both the first path and the second path that are not also inside another path that is above the first path and that border on the first path have the first path attribute and (2) at least a second path region in the second path is outside the first path, borders the first path, and has the second path attribute, designating the first path as above the second path in apparent stacking order;
   editing the drawing by modifying at least one of the first path and the second path, and at least the first overlapping region is modified and a second overlapping region is created;
   assigning the path attribute to at least one of the first overlapping region and the second overlapping region based on the derived apparent stacking order of the first path and the second path; and
   displaying the edited drawing of the first path and the second path on a display.

2. A method as recited in claim 1, where the first path attribute includes color and the second path attribute includes color.

3. A system, comprising:
   a processor configured to:
   create a drawing to define at least a first path and a second path, wherein the first path and the second path overlap, and wherein the first path has a first path attribute, and the second path has a second path attribute;
   determine a first overlapping region wherein the first path and the second path overlap;
   derive an apparent stacking order for the first overlapping region, wherein the apparent stacking order is determined at least in part by:
   determine if (1) the first overlapping region and every region in the first path is also in the second path and (2) for every boundary separating the first overlapping region inside the first path from an adjacent region outside the first path, the first overlapping region and the adjacent region on the two sides of the boundary have the first path attribute and the second path attribute, respectively, designate said first path as above the second path in apparent stacking order; and
   else determine if (1) the first overlapping region and all regions inside both the first path and the second path that are not also inside another path that is above the first path and that border on the first path have the first path attribute and (2) at least a second path region in the second path is outside the first path, borders the first path, and has the second path attribute, designate the first path as above the second path in apparent stacking order;
   edit the drawing by modifying at least one of the first path and the second path, and at least the first overlapping region is modified and a second overlapping region is created;
   assign the path attribute to at least one of the first overlapping region and the second overlapping region based on the derived apparent stacking order of the first path and the second path; and
   display the edited drawing of the first path and the second path on a display.

4. A computer program product, the computer program product being embodied in a non-transitory computer readable medium executable by a processor, the computer program product comprising computer instructions for:
   creating a drawing to define at least a first path and a second path, wherein the first path and the second path overlap, and wherein the first path has a first path attribute, and the second path has a second path attribute;
   determining a first overlapping region wherein the first path and the second path overlap;
   deriving an apparent stacking order for the first overlapping region, wherein the apparent stacking order is determined at least in part by:
   determining, by the processor, if (1) the first overlapping region and every region in the first path is also in the second path and (2) for every boundary separating the first overlapping region inside the first path from an adjacent region outside the first path, the first overlapping region and the adjacent region on the two sides of the boundary have the first path attribute and the second path attribute, respectively, designating said first path as above the second path in apparent stacking order; and
   else determining if (1) the first overlapping region and all regions inside both the first path and the second path that are not also inside another path that is above the first path and that border on the first path have the first path attribute and (2) at least a second path region in the second path is outside the first path, borders the first path, and has the second path attribute, designating the first path as above the second path in apparent stacking order;
   editing the drawing by modifying at least one of the first path and the second path, and at least the first overlapping region is modified and a second overlapping region is created;
   assigning the path attribute to at least one of the first overlapping region and the second overlapping region based on the derived apparent stacking order of the first path and the second path; and
   displaying the edited drawing of the first path and the second path on a display.

* * * * *